US012114389B2

(12) United States Patent
Xu et al.

(10) Patent No.: US 12,114,389 B2
(45) Date of Patent: Oct. 8, 2024

(54) RRC-BASED USER DATA TRANSMISSION IN AN INACTIVE STATE

(71) Applicant: Apple Inc., Cupertino, CA (US)

(72) Inventors: Fangli Xu, Beijing (CN); Murtaza A Shikari, Mountain View, CA (US); Dawei Zhang, Saratoga, CA (US); Haijing Hu, Beijing (CN); Srinivasan Nimmala, San Jose, CA (US); Zhanfeng Jia, Belmont, CA (US); Sarma V Vangala, Campbell, CA (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 234 days.

(21) Appl. No.: 17/438,196

(22) PCT Filed: Oct. 22, 2020

(86) PCT No.: PCT/CN2020/122751
§ 371 (c)(1),
(2) Date: Sep. 10, 2021

(87) PCT Pub. No.: WO2022/082582
PCT Pub. Date: Apr. 28, 2022

(65) Prior Publication Data
US 2022/0322482 A1 Oct. 6, 2022

(51) Int. Cl.
*H04W 76/27* (2018.01)
(52) U.S. Cl.
CPC .................... *H04W 76/27* (2018.02)
(58) Field of Classification Search
CPC ..... H04W 76/27; H04W 24/10; H04W 28/02; H04W 76/19; H04W 76/20; H04W 76/18;
(Continued)

(56) References Cited

U.S. PATENT DOCUMENTS 10,855,359 B2* 12/2020 Zhou ................... H04B 17/17
10,856,163 B2* 12/2020 Kim ...................... H04L 5/001
(Continued)

FOREIGN PATENT DOCUMENTS

CN   110351744 A   10/2019
CN   110831261 A   2/2020
(Continued)

OTHER PUBLICATIONS

International Search Report for PCT Patent Application No. PCT/CN2020/122751; mailed Jul. 27, 2021.
(Continued)

*Primary Examiner* — Man U Phan
(74) *Attorney, Agent, or Firm* — Kowert, Hood, Munyon, Rankin & Goetzel, P.C.

(57) ABSTRACT

While in an inactive state, a user equipment (UE) device transmits a message to a base station. The message indicates the UE device's intent to perform transmission and/or reception of user data with the network during the inactive state. The message may include a portion of the user data and/or a buffer status report. The UE device receives a response message that induces a state transition in the UE device. Different state transitions (e.g., to idle, inactive, legacy inactive, connected) may be induced by different types of response message (e.g., release, release with suspend configuration, resume, setup). One particular type of response message causes the UE to stay in the inactive state and enables subsequent user data transmission/reception in the inactive state. The response message may implicitly (or explicitly) indicate that forwarding of the user data to a core network was successful.

19 Claims, 25 Drawing Sheets

(58) Field of Classification Search
CPC ............. H04W 24/08; H04W 36/0079; H04W 36/0085; H04W 36/08; H04W 36/305; H04W 74/0833; H04W 80/02; H04W 36/00; H04W 36/30; H04W 76/00; H04W 28/04; H04W 16/32; H04W 48/16; H04W 72/04; H04W 76/15; H04W 76/11; H04W 36/04; H04W 36/28; H04W 16/24; H04L 1/18; H04L 5/006; H04L 1/867; H04L 1/189; H04L 51/30; H04L 5/001; H04L 5/0098; H04L 1/1867
USPC .......................................................... 370/328
See application file for complete search history.

(56) References Cited

U.S. PATENT DOCUMENTS

| | | | |
|---|---|---|---|
| 11,228,954 B2 * | 1/2022 | Kim | H04W 36/0058 |
| 11,246,163 B2 * | 2/2022 | Cirik | H04W 24/08 |
| 11,546,790 B2 * | 1/2023 | Jung | H04L 5/0094 |
| 2018/0092157 A1 | 3/2018 | Chen | |
| 2019/0014492 A1 | 1/2019 | Kim | |
| 2020/0128484 A1 | 4/2020 | Su et al. | |
| 2020/0314700 A1 | 10/2020 | Da Silva | |
| 2021/0392537 A1 * | 12/2021 | Da Silva | H04W 76/38 |
| 2022/0086946 A1 * | 3/2022 | Huang | H04W 72/23 |
| 2022/0110085 A1 * | 4/2022 | Khoryaev | H04W 74/0833 |
| 2022/0124532 A1 * | 4/2022 | Rugeland | H04W 76/27 |
| 2022/0150739 A1 * | 5/2022 | Da Silva | H04W 24/10 |
| 2022/0151000 A1 * | 5/2022 | Virtej | H04W 24/10 |
| 2022/0191942 A1 * | 6/2022 | Ohseki | H04W 74/0833 |
| 2023/0189349 A1 * | 6/2023 | Lin | H04W 74/0833 370/329 |

FOREIGN PATENT DOCUMENTS

| | | |
|---|---|---|
| WO | 2019215694 A1 | 11/2019 |
| WO | 2020067944 A1 | 4/2020 |

OTHER PUBLICATIONS

Extended European Search Report for EP 20958165.1; Jun. 17, 2024.

CMCC "Basic procedure for data transmission in RRC inactive state"; 3GPP TSG-WG2 Meeting #111e R2-2007433; Aug. 17, 2020.

VIVO "General Considerations on Small Data Transmission"; 3GPP TSG-RAN WG2 Meeting #111e R2-2006550; Aug. 17, 2020.

Ericsson "Small data transmission for inactive UEs"; 3GPP TSG-RAN WG2 #95bis R2-166922; Oct. 10, 2016.

Office Action for CN Patent Application No. 202080106521.9; Jul. 13, 2024.

* cited by examiner

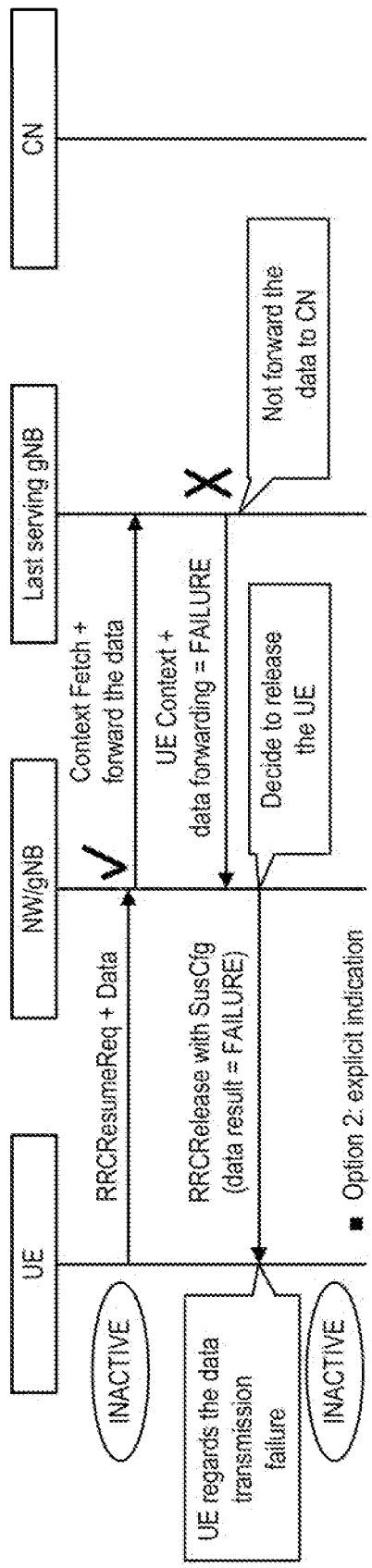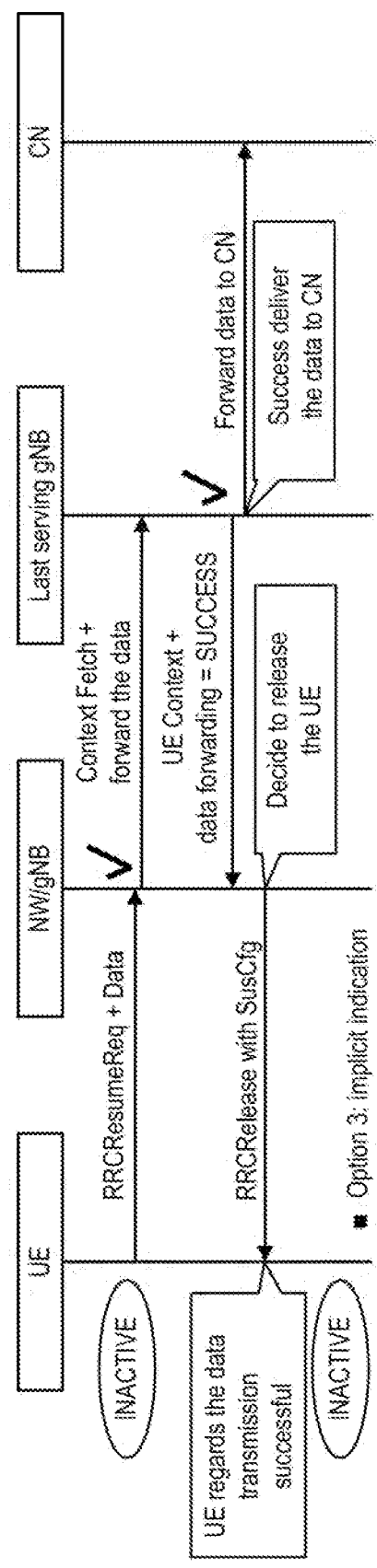
Fig. 14B
Fig. 14C

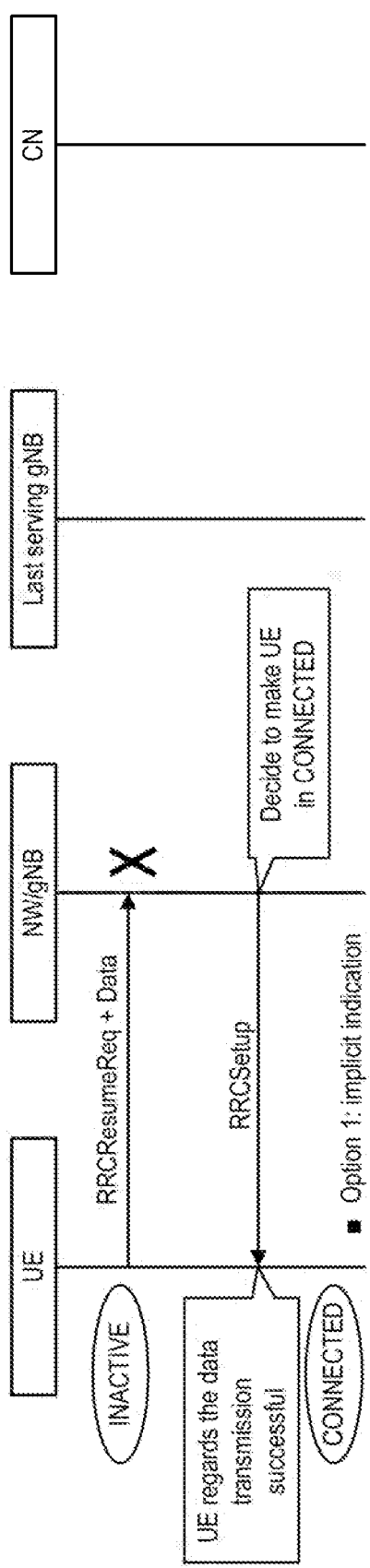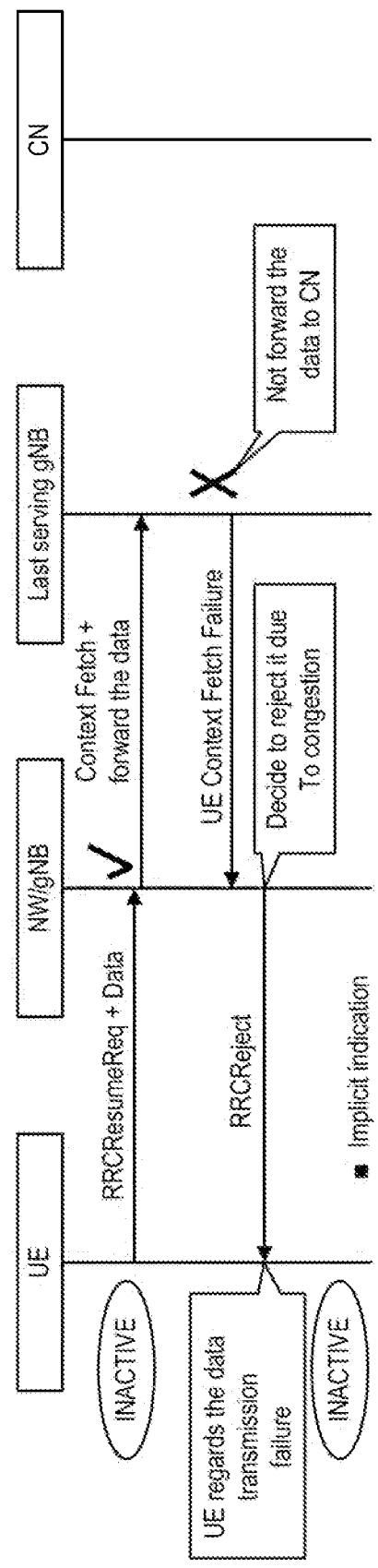

2300 

transmit information to a network, where the information includes a Radio Resource Control (RRC) message, wherein the RRC message includes an indication of the UE device's intent to perform transmission and/or reception of user data with the network during the inactive state   2310

FIG. 23

2400 

while a user equipment (UE) device is in an inactive state, receive information from the UE device, wherein the information includes a Radio Resource Control (RRC) message, wherein the RRC message includes an indication of the UE device's intent to perform transmission and/or reception of user data with the network during the inactive state   2410

FIG. 24

RRC-BASED USER DATA TRANSMISSION IN AN INACTIVE STATE

PRIORITY CLAIM INFORMATION

This application is a U.S. national stage application of International Application No. PCT/CN2020/122751, filed on Oct. 22, 2020, titled "RRC-Based User Data Transmission in an Inactive State", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms enabling a user equipment (UE) device to perform user data transmission and/or reception (especially of small data parcels) while remaining in an inactive state.

DESCRIPTION OF THE RELATED ART

A wireless UE device in an inactive state (e.g., an RRC INACTIVE state) may not be able to transmit and/or receive user data without first transitioning to a connected state. The time required for this transition is non-trivial. (RRC is an acronym for Radio Resource Control.)

SUMMARY

In some embodiments, a method for operating a user equipment (UE) device may include one or more of the following operations. While the UE device is in an inactive state, the UE device may transmit information to a network, where the information includes a Radio Resource Control (RRC) message. The RRC message may include an indication of the UE device's intent to perform transmission and/or reception of user data with the network during the inactive state.

In some embodiments, the RRC message may be an RRC resume request message, and the information may include: at least a portion of the user data; and/or a buffer status report.

In some embodiments the RRC message may include a cause indicator field that indicates the cause for which the RRC message is being transmitted. The cause indicator field may be set to a value indicating data transmission (or small data transmission) as the cause.

In some embodiments, the information transmitted by the UE device may be (or may be contained within) a Medium Access Control Protocol Data Unit (MAC PDU).

In some embodiments, while in the inactive state, the UE device may receive a response message from the network. The response message may induce a state transition in the UE device. Different state transmissions may be induced by different types of response message.

In some embodiments, the response message may be a release message, and may induce a state transition to an idle state.

In some embodiments, the response message may be a release message with a suspend configuration, and may induce a state transition to a legacy inactive state.

In some embodiments, the response message may be a resume message, and may induce a state transition to a connected state.

In some embodiments, the response message may be a setup message, and may induce a state transition to a connected state.

In some embodiments, the response message may cause the UE device to stay in the inactive state and enter a subsequent user data transmission mode. In the subsequent user data transmission mode, the UE device may transmit and/or receive additional user data (to/from the base station) while remaining in the inactive state.

In some embodiments, the response message may implicitly indicate that forwarding of the user data to a core network was successful.

In some embodiments, the response message may explicitly indicate whether forwarding of the user data to a core network was successful.

In some embodiments, a non-transitory memory medium may store program instructions. The program instructions, when executed by processing circuitry, may cause the processing circuitry to perform any of the method embodiments described above.

In some embodiments, a user equipment (UE) device may include a radio subsystem; processing circuitry coupled to the radio subsystem; and memory storing program instructions. The program instructions, when executed by the processing circuitry, may cause the UE device to perform any of the method embodiments described above.

In some embodiments, a method for operating a base station (BS) may include one or more of the following operations. While a user equipment (UE) device is in an inactive state, the base station may receive information from the UE device, where the information includes a Radio Resource Control (RRC) message. The RRC message may include an indication of the UE device's intent to perform transmission and/or reception of user data with the network during the inactive state.

In some embodiments, the RRC message may be an RRC resume request message. Furthermore, the information may include: at least a portion of the user data; and/or a buffer status report.

In some embodiments, the RRC message may include a cause indicator field that indicates the cause for the RRC message. The cause indicator field may be set to a value indicating data transmission (or small data transmission) as the cause.

In some embodiments, the message may be (or may be contained in) a Medium Access Control Protocol Data Unit (MAC PDU).

In some embodiments, the method may also include, while the UE device is in the inactive state, transmitting a response message to the UE device. The response message may induce a state transition in the UE device. Different state transmissions may be induced by different types of response message.

In some embodiments, the response message may be a release message, and may induce a state transition to an idle state.

In some embodiments, the response message may be a release message with a suspend configuration, and may induce a state transition to a legacy inactive state.

In some embodiments, the response message may be a resume message, and may induce a state transition to a connected state.

In some embodiments, the response message may be a setup message, and may induce a state transition to a connected state.

In some embodiments, the response message may cause the UE device to stay in the inactive state and enter a subsequent user data transmission mode. While the UE device remains in the inactive state and the subsequent user data transmission mode, the base station may transmit and/or receive additional user data to/from the UE device.

In some embodiments, the response message may implicitly indicate that forwarding of the user data to a core network was successful.

In some embodiments, the response message may explicitly indicate whether forwarding of the user data to a core network was successful.

In some embodiments, a non-transitory memory medium may store program instructions. The program instructions, when executed by processing circuitry, may cause the processing circuitry to perform any of the method embodiments described above.

In some embodiments, a base station may include a radio subsystem; processing circuitry coupled to the radio subsystem; and memory storing program instructions. The program instructions, when executed by the processing circuitry, may cause the base station to perform any of the method embodiments described above.

BRIEF DESCRIPTION OF THE DRAWINGS

A better understanding of the present subject matter can be obtained when the following detailed description of the preferred embodiment is considered in conjunction with the following drawings.

FIGS. 14A-14C illustrate three different ways to indicate success or failure of network data forwarding, in the case where an RRCRelease message with suspend configuration is used to cause transition to a legacy inactive state, according to some embodiments.

FIGS. 16A-16B illustrate two different ways to implicitly indicate failure of a user data transmission, in the case where an RRCSetup message is used to cause transition to an connected state, according to some embodiments.

FIGS. 17A-17B illustrate two different ways to implicitly indicate failure of a user data transmission, in the case where an RRCReject message is used to cause transition to a legacy inactive state, according to some embodiments.

FIG. 18 illustrates a procedure in which a resume message with explicit state indication is transmitted to the user equipment, according to some embodiments.

FIG. 19 illustrates a procedure in which a resume message with explicit state indication and explicit data forwarding success indication is transmitted to the user equipment, according to some embodiments.

FIG. 20 illustrates a procedure in which a release message with subsequent transmission configuration is transmitted to the user equipment, according to some embodiments.

FIG. 21 illustrates a procedure in which a release message with suspend, including subsequent transmission configuration and explicit data forwarding success indication is transmitted to the user equipment, according to some embodiments.

FIG. 22 illustrates a procedure in which an L1 and/or L2 message is used to enable subsequent user data transmission for a user equipment in the inactive state, according to some embodiments.

FIG. 23 illustrates a method for operating user equipment (UE) device, to enable the UE device to perform user data transmission and/or reception during the inactive state (e.g., an RRC inactive state).

FIG. 24 illustrates a method for operating a base station, to enable the base station to perform data transmission and/or reception with a user equipment (UE) device while the UE device is in an inactive state (e.g., an RRC inactive state).

Figure 1:
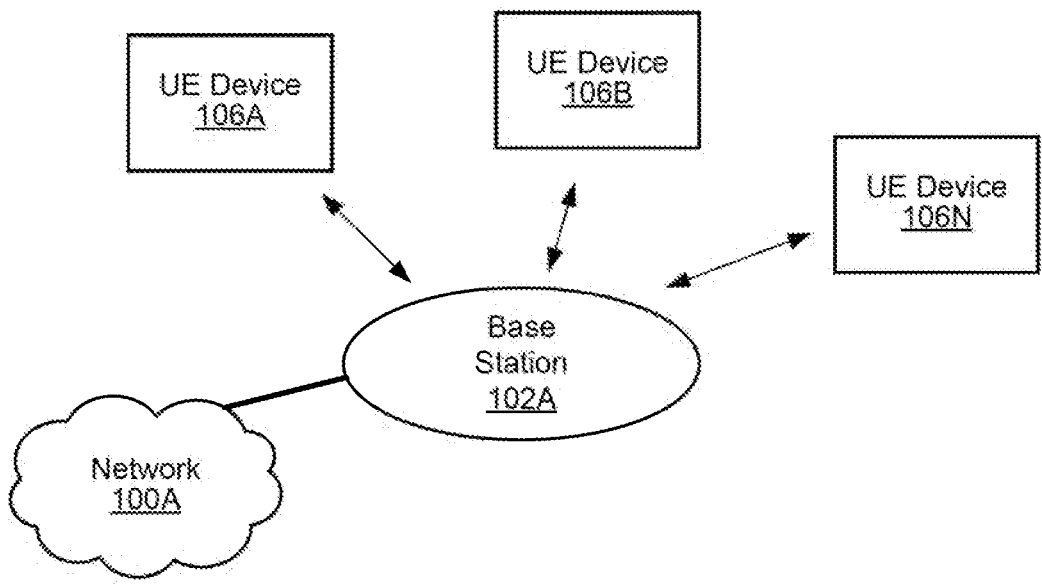
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

The following acronyms are used in this disclosure.
3GPP: Third Generation Partnership Project
3GPP2: Third Generation Partnership Project 2
5G NR: $5^{th}$ Generation New Radio
BW: Bandwidth
BWP: Bandwidth Part
CRC: Cyclic Redundancy Check
CSI: Channel State Information
CSI-RS: CSI Reference Signal
DCL: Downlink Control Information
DL: Downlink
eNB (or eNodeB): Evolved Node B, i.e., the base station of 3GPP LTE
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Media Access Control
MAC-CE: MAC Control Element
NR: New Radio
NR-DC: NR Dual Connectivity
NW: Network
PDCCH: Physical Downlink Control Channel
RAT: Radio Access Technology
RNTI: Radio Network Temporary Identifier
RRC: Radio Resource Control
RRM: Radio Resource Management
RS: Reference Signal
SR: Scheduling Request
SSB: Synchronization Signal Block
TCI: Transmission Configuration Indication
UE: User Equipment
UL: Uplink
UMTS: Universal Mobile Telecommunications System

Terms

The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
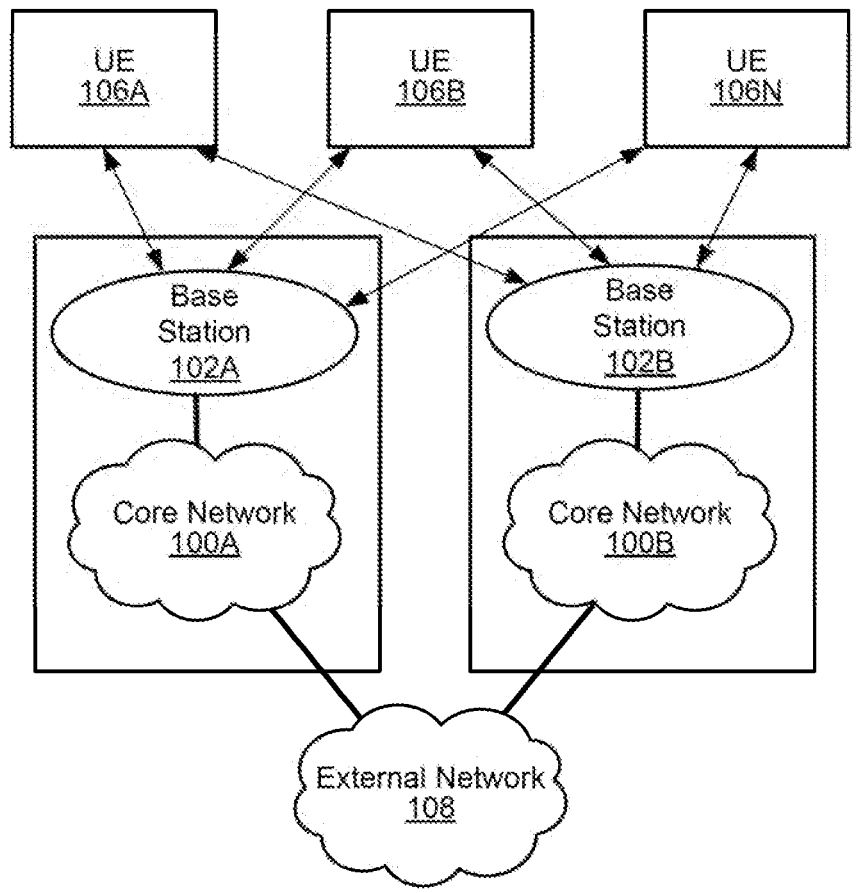
Figure 3:
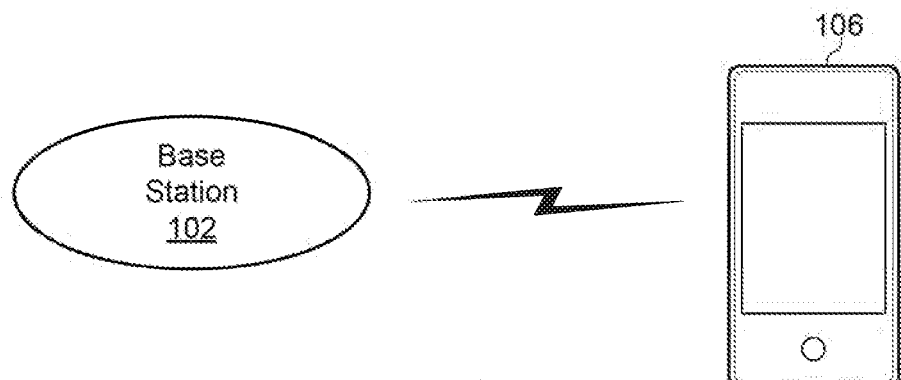
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 16B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a rust cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B).

The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UNITS (W-CDMA, TD-SCDMA, etc.), CDMA2000 (1xRTT, 1xEV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
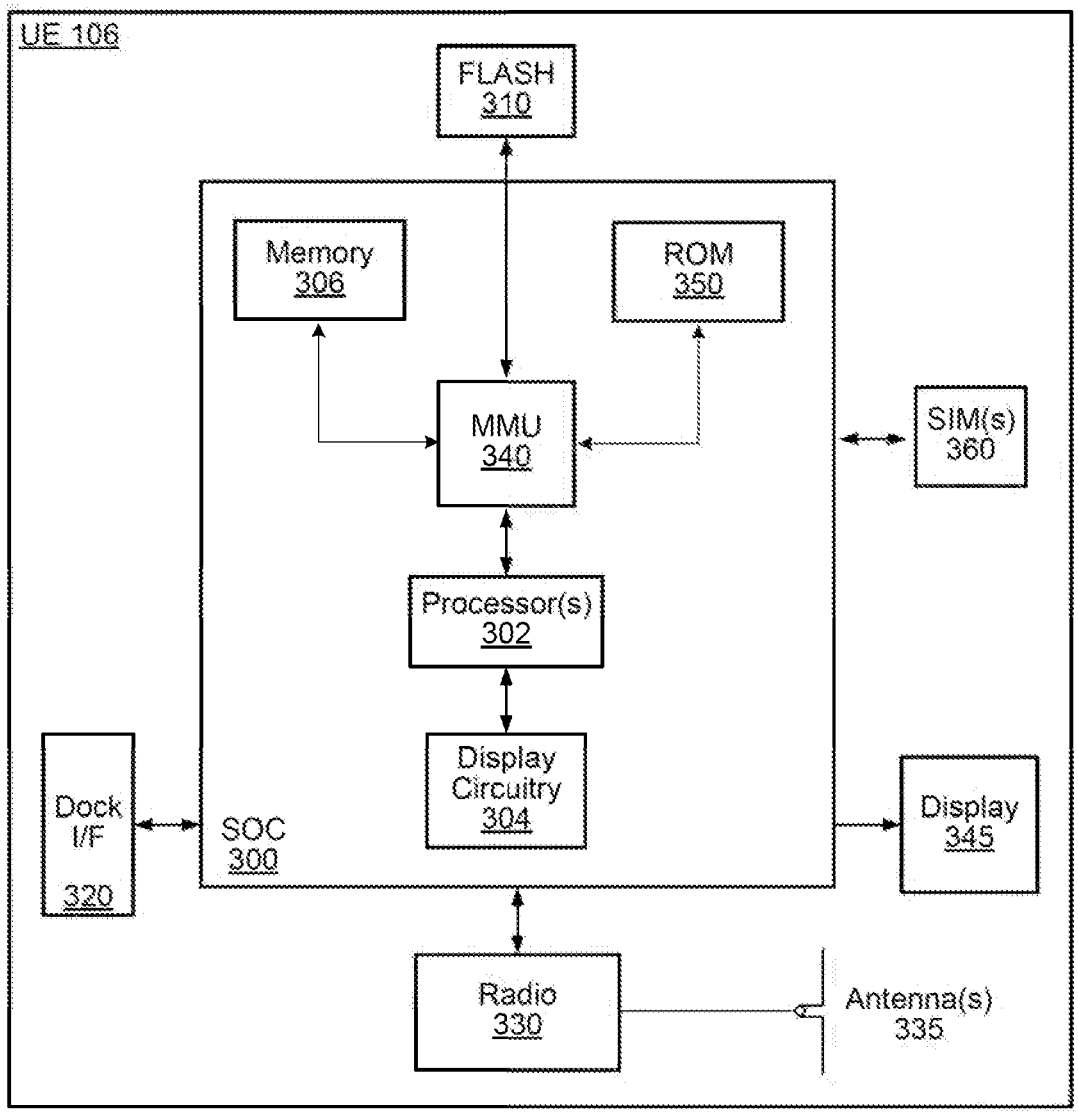
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
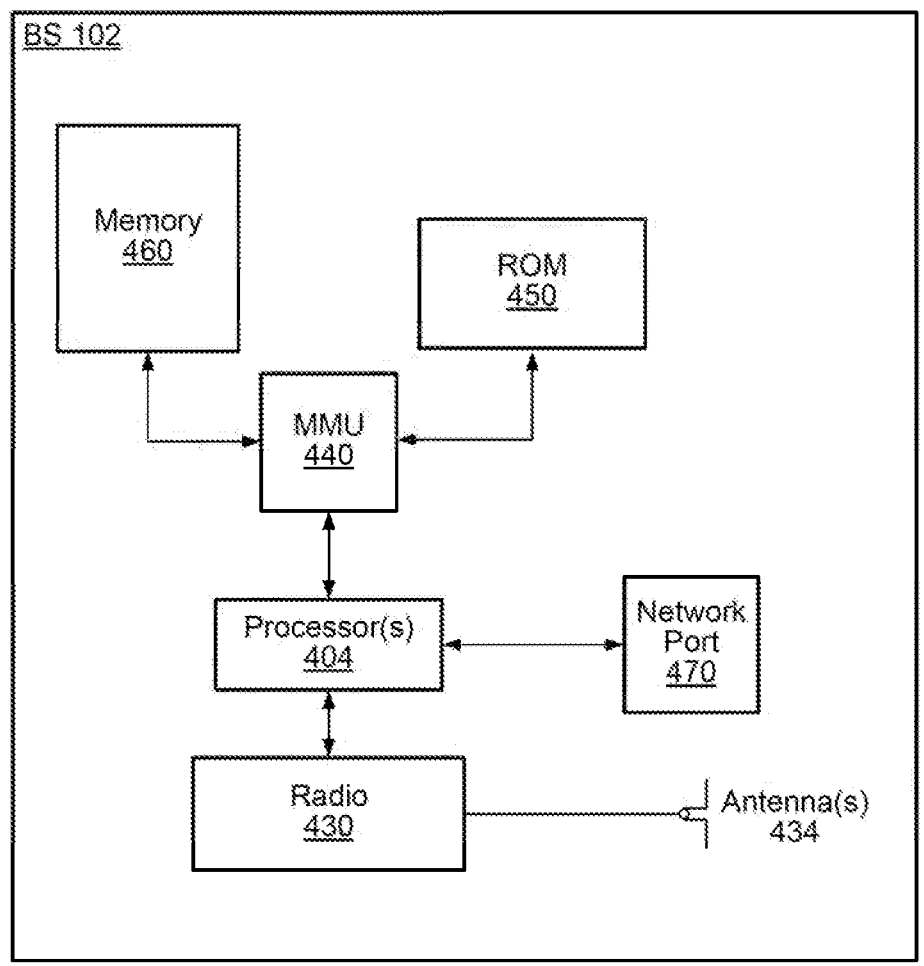
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider.

The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
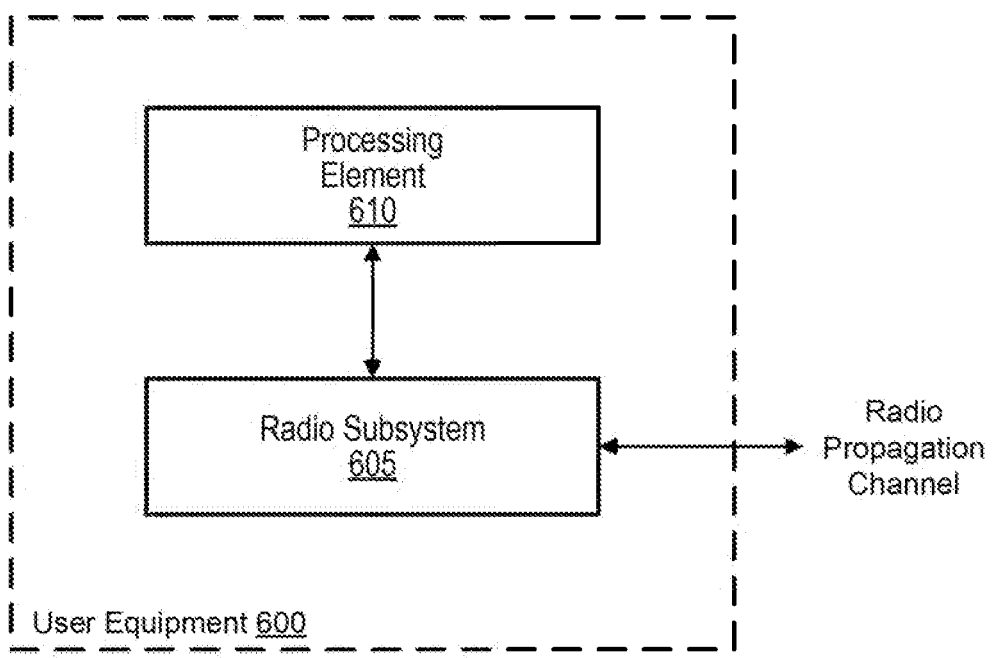
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
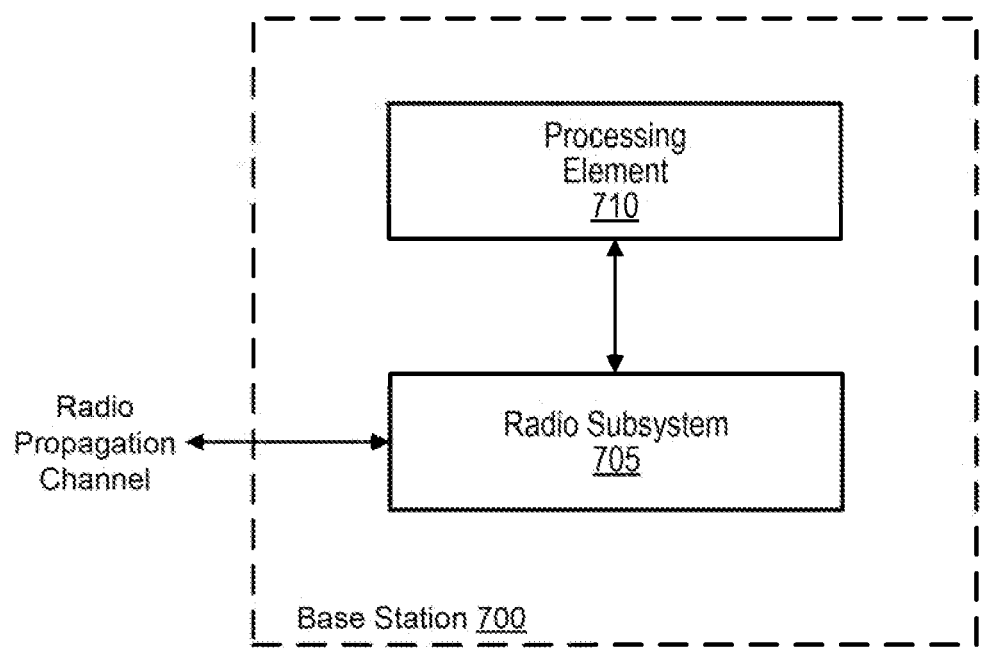
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times. The radio subsystem 710 may be coupled to an antenna subsystem, including one or more antennas, e.g., an array of antenna, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Radio Resource Control (RRC) INACTIVE State

In some embodiments, the behavior of a user equipment (UE) in the INACTIVE state may be described in terms of its behaviors in the control plane and the user plane. In the control plane, the INACTIVE UE may: have a network access stratum (NAS) connection to the core network, and no dedicated access stratum (AS) resource. Furthermore, the UE may retain the Radio Resource Control (RRC) configuration that it had before entering the INACTIVE state. In the user plane, the UE may not be able to perform any dedicated data transmission/reception. If a dedicated data transmission/reception needs to be performed, the UE needs to enter the CONNECTED state. For DL data transmission, the gNB may page the UE via a RAN paging mechanism, to trigger the UE's transition to the CONNECTED state. (RAN is an acronym for Radio Access Network.) For UL data transmission, the UE may trigger a random access (RACH) procedure, to enter the CONNECTED state. With respect to mobility, an INACTIVE UE may move within a RAN notification area (RNA) without notifying the Next Generation RAN (NG-RAN). Cell selection and re-selection may be performed in the same fashion as in the RRC IDLE state.

In some embodiments, the UE may make different state transitions under different circumstances. For example, the gNB may cause the UE to transition from the CONNECTED state to the INACTIVE state using an RRC Release with suspend information. As another example, the gNB may cause the UE to transition from the INACTIVE state to the CONNECTED state as part of an RRC Resume procedure.

As yet another example, the UE may transition from an INACTIVE state to an IDLE state (1) in response to an RRC Release or (2) when the UE cannot find a cell for camping.

UE Transition from INACTIVE State to CONNECTED State

Figure 8:
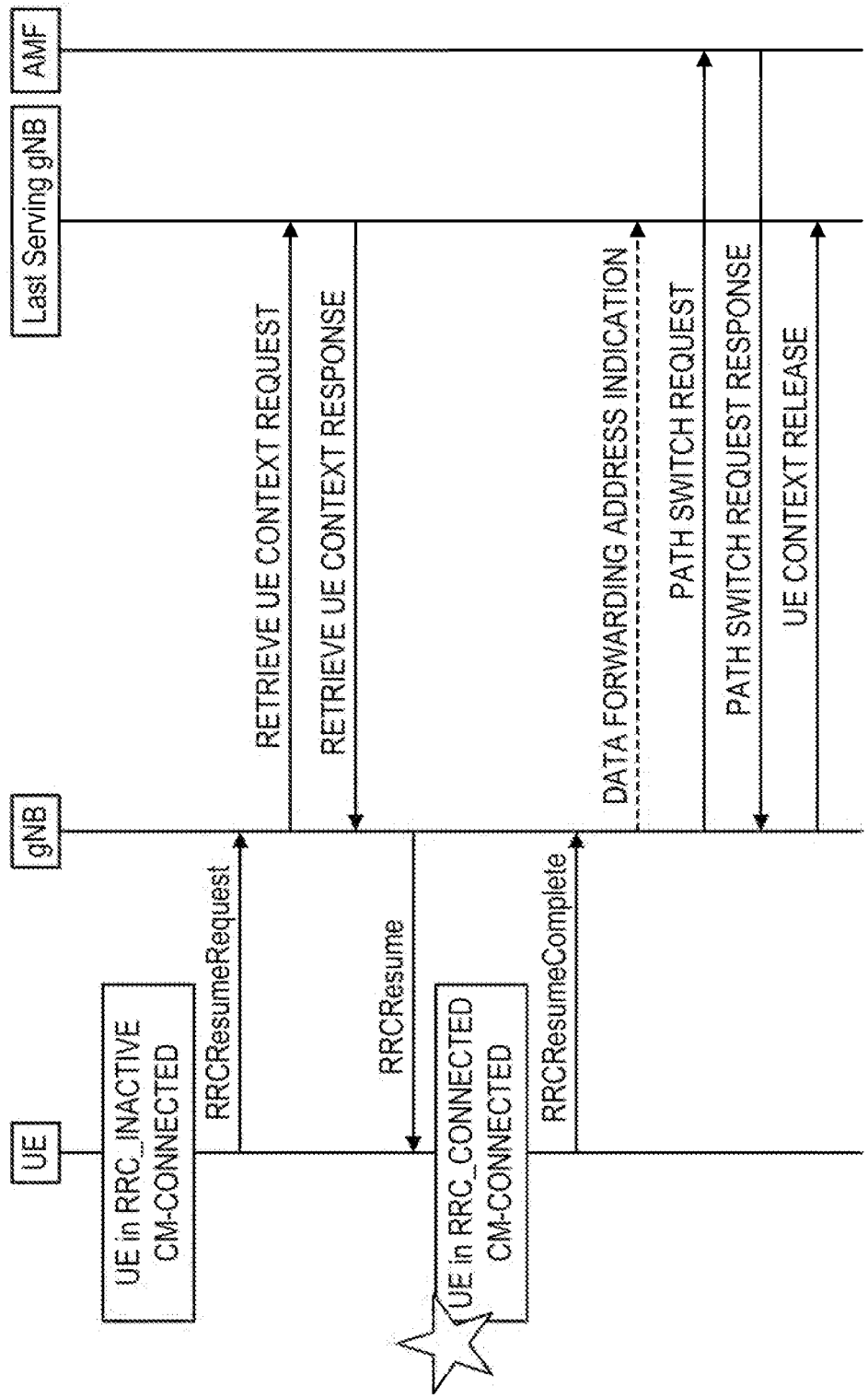
FIG. 8 illustrates an example of a procedure for causing the transition of user equipment (UE) from the INACTIVE state to the CONNECTED state, according to some embodiments.

In some embodiments, a UE may transition from the INACTIVE State to the CONNECTED state as shown in FIG. 8. We start the discussion of FIG. 8 with the UE in an RRC-INACTIVE CM-CONNECTED state. (CM is an acronym for Connection Management.) To initiate a transition to the connected state, the UE may transmit a resume request (e.g., an RRCResumeRequest) to a current gNB. In response to receiving the resume request, the gNB may transmit a context retrieval request (i.e., a request for the retrieval of UE context) to a last serving gNB. The UE context may include UE Access Stratum (AS) configuration and variable(s) of a previous connected state. The UE context may be used by current gNB to decide the RRC configuration in the new accessed serving cell. In response to receiving the context retrieval request, the last serving gNB may transmit a context retrieval response, containing the requested UE context, to the current gNB.

In response to receiving the context retrieval response, the current gNB may transmit a resume message (e.g., an RRCResume message) to the UE. In response to receiving the resume message, the UE may transition to an RRC-CONNECTED CM-CONNECTED state. In that state, the UE may transmit a resume complete message (e.g., an RRCResumeComplete message) to the current gNB. In response receiving the resume complete message, the current gNB may transmit a data forwarding address indication to the last serving gNB, and transmit a path switch request to an Access & Mobility Management Function (AMF). In response to receiving the path switch request, the AMF may transit a response to the path switch request to the current gNB. In response to receiving this response, the current gNB may transmit to the last serving gNB a context release message, indicating that the UE context may be released in last serving gNB.

Patterns of Behavior when UE is in INACTIVE State

Figure 9A:
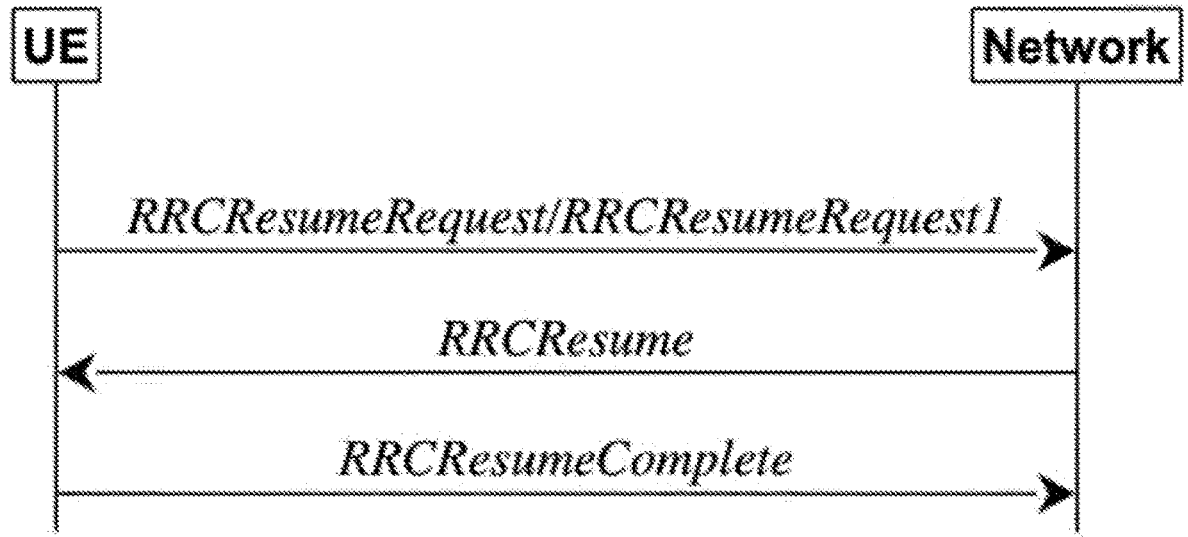
FIGS. 9A-9E illustrate five different patterns of behavior when a user equipment in the INACTIVE state transmits a resume request, according to some embodiments.
Figure 9B:
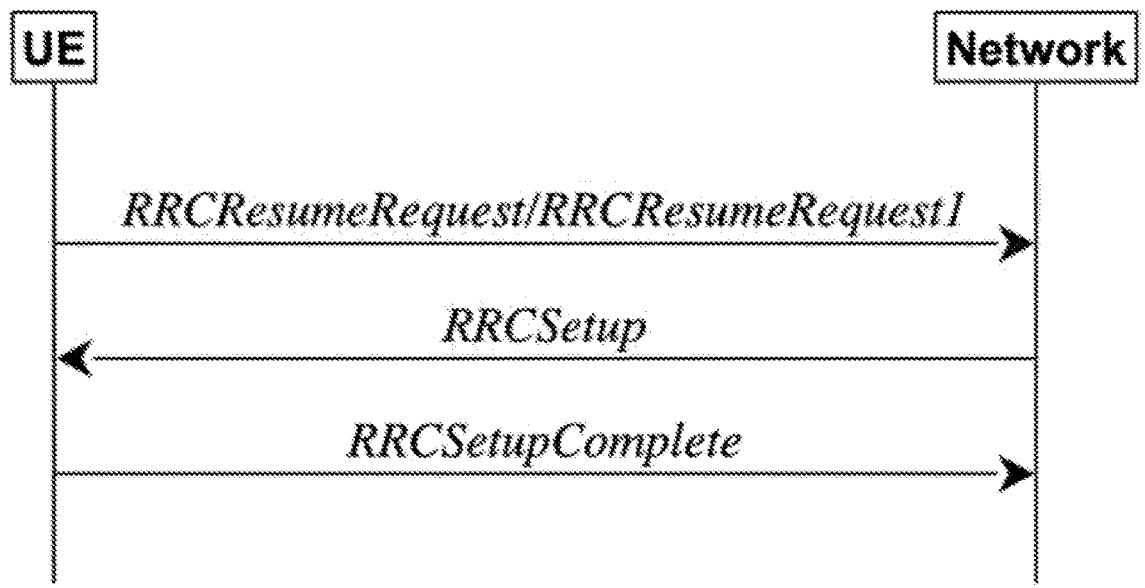
Figure 9C:
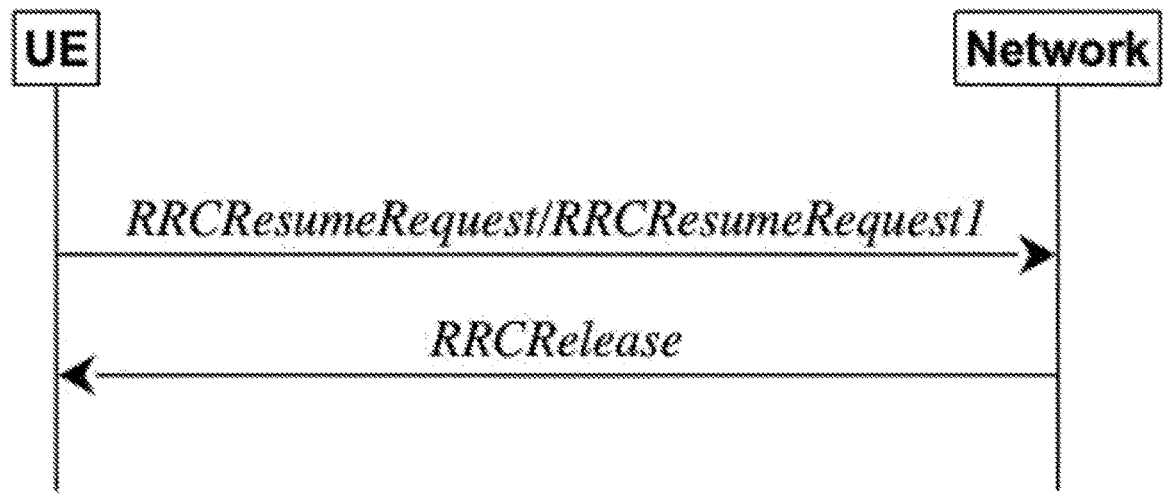
Figure 9D:
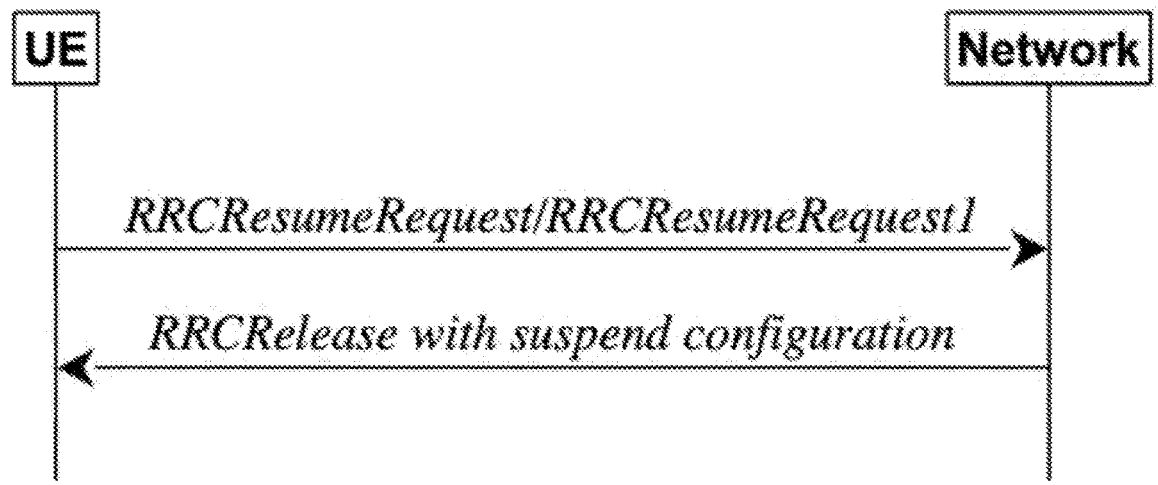
Figure 9E:
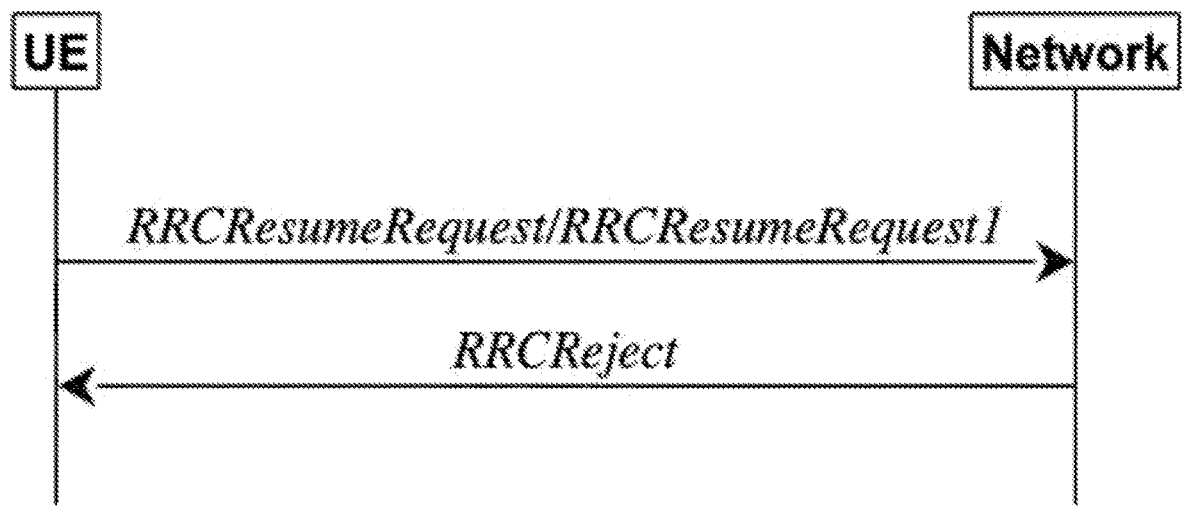

FIGS. 9A-9E illustrate five different patterns of behavior when a UE in the INACTIVE state transmit a resume request (or attempts to resume a suspended RRC connection). In FIGS. 9A, 9C and 9D, the attempt to resume may be interpreted as successful. FIG. 9B illustrates a case of resume with fallback to setup. In FIG. 9E, the attempt to resume is rejected by the network.

FIG. 9A illustrates a procedure in which the UE transitions from the INACTIVE state to a CONNECTED state, according to some embodiments. This procedure may be followed when the network is able to fetch UE context. From the INACTIVE state, the UE may initiate an attempt to resume a suspended RRC connection by sending a resume request (such as an RRCResumeRequest or an RRCResumeRequest1, e.g., as defined in 3GPP TS 38.331), Release 15. In response to receiving the resume request, the network may reply to the UE with a resume message (e.g., an RRCResume message). In response to receiving the resume message, the UE may transition to the CONNECTED state; and send a resume complete message (e.g., an RRCResumeComplete message) to the network, indicating that the process of resuming the connection is complete.

FIG. 9B illustrates a procedure in which the UE transitions from the INACTIVE state to a CONNECTED state, according to some embodiments. This procedure may be followed when the network cannot fetch UE context. From the INACTIVE state, the UE may initiate an attempt to resume a suspended RRC connection by sending a resume request. In response to receiving the resume request, the network may reply to the UE with a connection setup message (e.g., an RRCSetup message). In response to receiving the connection setup message, the UE may transition to the CONNECTED state; and send a setup complete message (e.g., an RRCSetupComplete message) to the network, indicating that the process of setting up the connection is complete.

FIG. 9C illustrates a procedure in which the UE transitions from the INACTIVE state to an IDLE state, according to some embodiments. This procedure may be followed when the network is able to fetch the UE context. From the INACTIVE state, the UE may initiate an attempt to resume a suspended RRC connection by sending a resume request. In response to receiving the resume request, the network may reply to the UE with a release message (e.g., an RRCRelease message). In response to receiving the release message, the UE may transition to the IDLE state.

FIG. 9D illustrates a procedure in which the UE makes a null transition from the INACTIVE state to the INACTIVE state, according to some embodiments. This procedure may be followed when the network is able to fetch the UE context, From the INACTIVE state, the UE may initiate an attempt to resume a suspended RRC connection by sending a resume request. In response to receiving the resume request, the network may reply to the UE by sending a release message (e.g., an RRCRelease message) with a suspend configuration. In response to receiving the release message with suspend configuration, the UE may remain in the INACTIVE state.

FIG. 9E illustrates a procedure in which the UE makes a null transition from the INACTIVE state to the INACTIVE state. This procedure may be followed when the network may not be able to fetch the UE context. From the INACTIVE state, the UE may initiate an attempt to resume a suspended RRC connection by sending a resume request. In response to receiving the resume request, the network may reply to the UE by sending a reject message (e.g., an RRCReject message). In response to receiving the reject message, the UE may remain in the INACTIVE state.

Figure 10A:
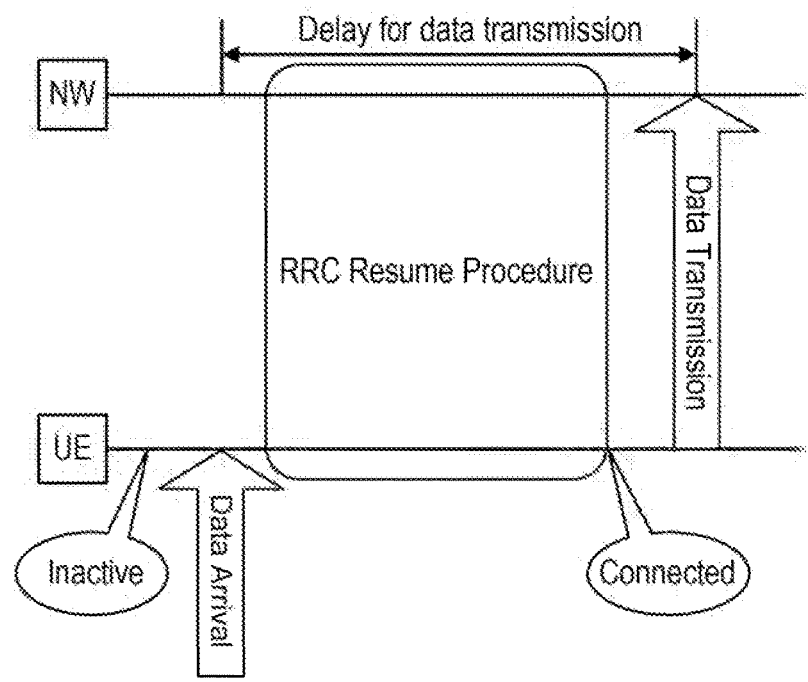
FIG. 10A illustrates a difficulty encountered when an INACTIVE UE needs to perform a user data transmission to the network in a legacy fashion.
Figure 10B:
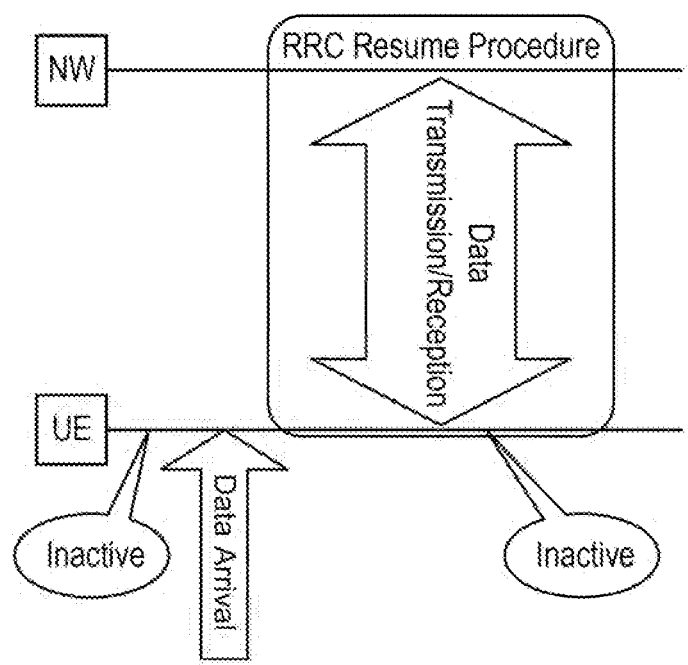
FIG. 10B illustrates an example of a solution to the problem shown in FIG. 10A, according to some embodiments.

FIG. 10A illustrates a difficulty encountered when an INACTIVE UE needs to perform a user data transmission to the network in a legacy fashion. While in the INACTIVE state, the UE senses data is available for uplink transmission. For example, the UE may sense the arrival of data in an uplink transmission buffer. In response to the data arrival, the UE may trigger an RRC resume procedure. The resume procedure may result in the UE's transition to the CONNECTED state or the IDLE state or the INACTIVE state. No user data transmission is allowed during RRC resume procedure. If the resume procedure ends with a successful transition to the CONNECTED state, as shown in FIG. 10A, the UE may perform an uplink data transmission to service the waiting uplink data. The time delay between the data arrival event and the uplink transmission may be nontrivial. It is unfortunate that the UE needs to wait for the resume procedure to complete before transmitting, especially when the amount of data to be transmitted is small.

FIG. 103 illustrates a solution for the above described difficulty, according to some embodiments. The network and the UE may be provided with mechanisms that enable the UE to perform user data transmission(s)—uplink and/or downlink—during the RRC resume procedure, while the UE remains in the INACTIVE state.

In some embodiments, the UE and the network may support mechanisms enabling the UE to perform small data transmission(s) in the INACTIVE state. While in an INACTIVE state, the UE may perform small data transmissions. e.g., using one or more messages of a random access procedure. The base station (e.g., a gNB of 3GPP NR) may fetch UE context and forward of the UE's user data to a core network. e.g., with or without anchor relocation.

In some embodiments, the INACTIVE UE may transmit uplink user data on pre-configured PUSCH resources. (PUSCH is an acronym for Physical Uplink Shared Channel.)

RRC-Based Small Data Transmission in INACTIVE State

In some embodiments, a network (NW) may configure the UE to support a small data transmission (SDT) procedure in the INACTIVE state. The UE may initiate the SDT procedure, e.g., by transmitting a release message with suspend configuration (e.g., an RRCRelease with SuspendConfig). A suspend configuration may be interpreted as a configuration to be used by the UE for transmission during the INACTIVE state. A serving cell (or a base station) may or may not support the SDT feature. A serving cell (or base station) may indicate that it supports the SDT feature, e.g., via a broadcast message. A UE may decode the broadcast message to determine that the serving cell (or base station) supports the SDT feature. Alternatively, the LIE may determine that the serving cell (or base station) supports the SDT feature based on a previous dedicated configuration. (in the dedicated configuration approach, the network may previously send the RRCRelease with suspend configuration to set to UE into INACTIVE state. In this message, the network may enable the SDT feature and indicate a list of applicable cells.)

In some embodiments, the UE may trigger the SDT procedure in response to the one or conditions (e.g., configurable conditions) being satisfied. The action of triggering the SDT procedure may include performing an uplink transmission including a resume request message (e.g., an RRCResumeRequest message). The resume request message may include: the LE identity in the INACTIVE state (e.g., I-RNTI); the UE Medium Access Control Identity (MAC-I, for security checking); and an indication of access cause. (RNTI is an acronym for Radio Network Temporary Identity.) The resume request message may include an indication of the cause for which the UE making the request. The cause indication may be set to an SDT state, i.e., a state indicating that a small data transmission is requested.

In some embodiments, in response to receiving the resume request message with cause equal to SDT, the network may perform access control, security check and UE identification in a legacy fashion, and transmit a response message to the UE. The network may set the UE state to one of the following based on the kind of response message it transmits to the UE: (1) CONNECTED; (2) INACTIVE; (3) IDLE; (4) INACTIVE with subsequent transmission. Legacy response messages may be used to set the UE state to any of states (1), (2) and (3). However, for the state (4), a new type of RRC response message and procedure may be required.

UE Operation to Trigger the SDT Procedure

Figure 11:
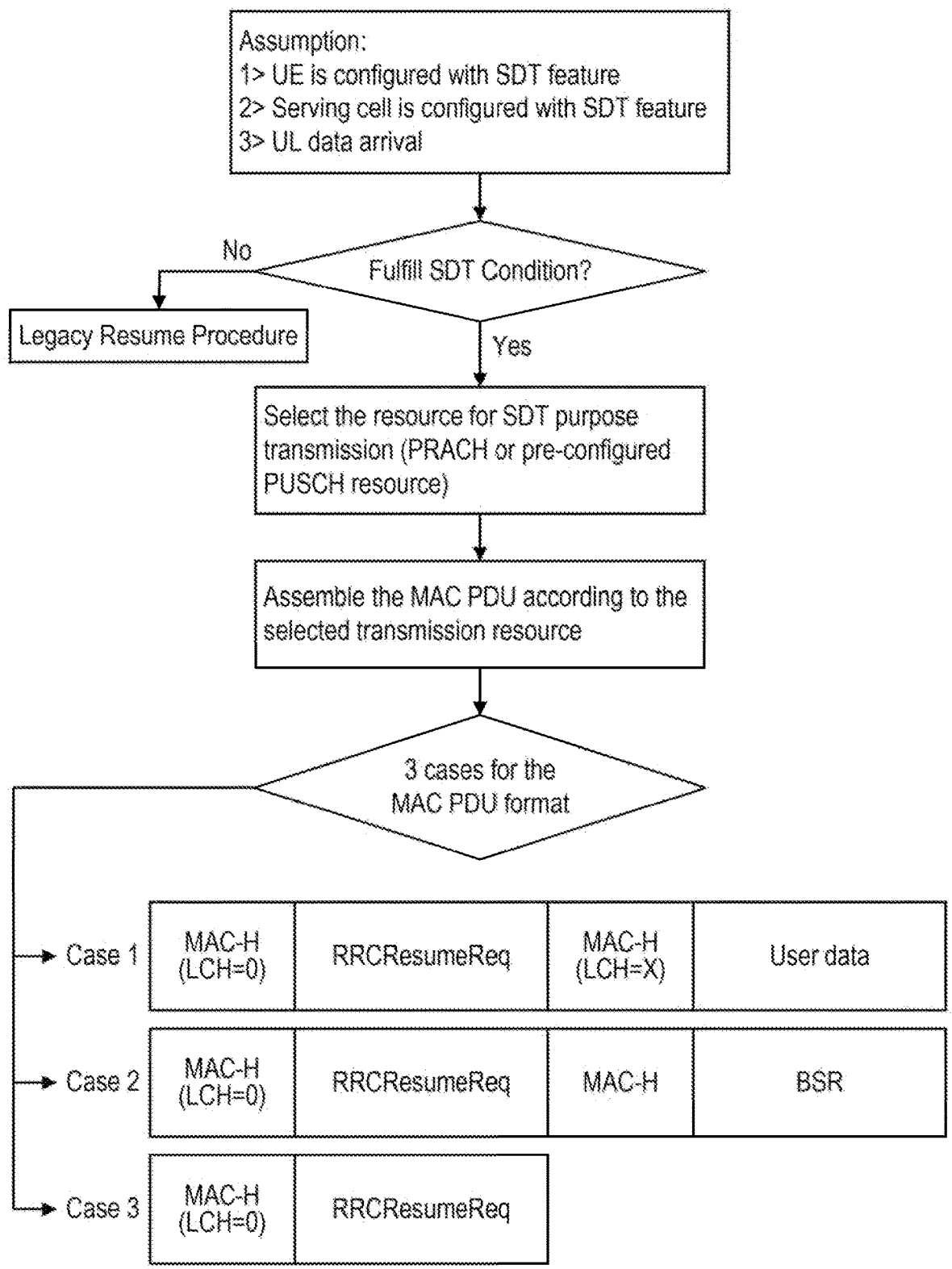
FIG. 11 illustrates an example of a procedure that a user equipment may employ for initiating small data transmission, according to some embodiments.

As shown in FIG. 11, upon UL data arrival, the UE may first evaluate whether to trigger SDT procedure or legacy resume procedure. The UE may trigger the SDT procedure when one or more conditions (e.g., network configurable conditions) are fulfilled. The conditions may include one or more of the following. According to a first condition, the UE may determine if the associated local channel (LCH) or data radio bearer (DRB) is configured for SDT operation. According to a second condition, the UE may determine if the available data amount is less than a configured threshold. According to a third condition, the UE may determine if the radio signal quality is greater than a quality threshold. If the one or more desired (or configured) conditions are not fulfilled, the UE may trigger a legacy resume procedure. However, if the UE is configured with the SDT feature, and the one or more desired (or configured) conditions are fulfilled, the UE may trigger the SDT procedure by generating a resume message (e.g., an RRC resume message), and set the resume cause=SDT. The UE may select the SDT resource (PRACH, pre-configured PUSCH) for transmission, and assemble a MAC PDU according to the Transport Block Size (TBSize). (MAC PDU is an acronym for Medium Access Control—Protocol Data Unit.) If the selected resource is not sufficiently large to accommodate all the user data to be transmitted, the UE may include within the MAC PDU at least the RRC message, and additionally include part of the user data and/or a buffer status report (BSR).

Network Behavior Upon Receiving the First UL Message

In some embodiments, when receiving RRCResumeRequest with the cause value=SDT, the network (NW) may determine from the cause value that the initial access is triggered by the UE's desire to perform small data transmission (SDT), The network (e.g., a base station such as a gNB) may decide to send a response to UE based on any of the following cases. Different types of response may elicit different outcomes at the UE.

Case 1: The network may transmit an RRCRelease to direct the UE to transition to the IDLE state.

Case 2: The network may transmit an RRCRelease with suspend configuration to direct the UE to transition to a legacy INACTIVE state.

Case 3: The network may transmit an RRCResume to direct the UE to transition to the CONNECTED state.

Case 4: The network may transmit an RRCSetup message to direct the UE to transition from the IDLE state to the CONNECTED state.

Case 5: The network may transmit an RRCReject message to direct the UE to stay in a legacy INACTIVE state.

Case 6: The network may transmit an new type of response message to direct the UE transition to the INACTIVE state with subsequent data transmission.

In some embodiments, the network may indicate to the UE whether or not the user data portion that was transmitted together with the RRCResumeRequest has been successfully handled by the NW, That indication may be provided in the following ways. In a first option, the NW may explicitly indicate the data processing result (SUCCESS or FAILURE) in the response message. In a second option, the success or failure result may be implicitly indicated by the transmission or non-transmission of a special RRC response message. (Transmission of the special RRC response message may indicate success.)

Figure 12:
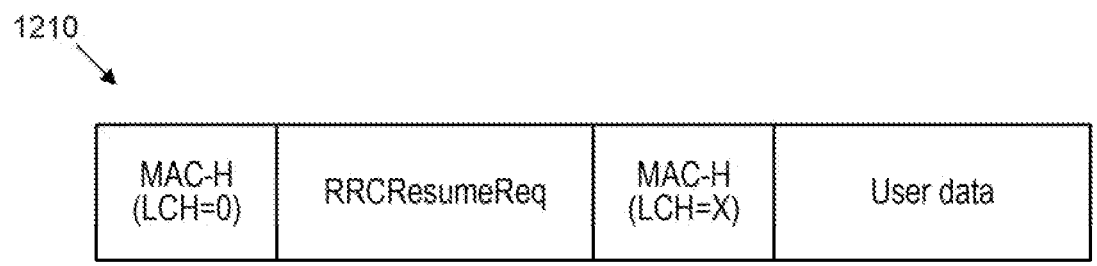
FIG. 12 illustrate one possible structure for a protocol data unit (PDU) for initiating user data transmission and/or reception with the network, according to some embodiments.

As shown in FIG. 12, a Medium Access Control Protocol Data Uni (MAC PDU) 1210 may include one or more sub-PDU. Each sub-PDU may include a corresponding header (MAC-H) and a corresponding payload. A first sub-PDU may include a header with logical channel number (LCH) equal to zero, and a payload containing the RRC resume request. A second sub-PDU may include a header with a logical channel number X, e.g., different from zero, and a payload including the user data (or a portion of the user data).

Upon receiving the response message, the UE may operate on the data portion as follows. When the response indicates success, the UE may regard the response transmission as a Radio Link Control Acknowledgement (RLC ACK), and discard the data portion. When the response indicates failure, there are different options for handling the data portion.

In a first option, the UE may regards the failure as an RLC NACK (Negative Acknowledgement), and wait for the next time of RLC Protocol Data Unit (PDU) retransmission.

In a second option, the UE may discard the RLC PDU, and wait for the next time of PDCP PDU retransmission. (PDCP is an acronym for Packet Data Convergence Protocol.)

In a third option, the UE may discard the RLC PDU and the PDCP PDU, and wait for the next time of PDCP SDU retransmission. (SDU is an acronym for Service Data Unit.)

Case 1: Inducing Transition to the IDLE State Using RRCRelease

Figure 13A:
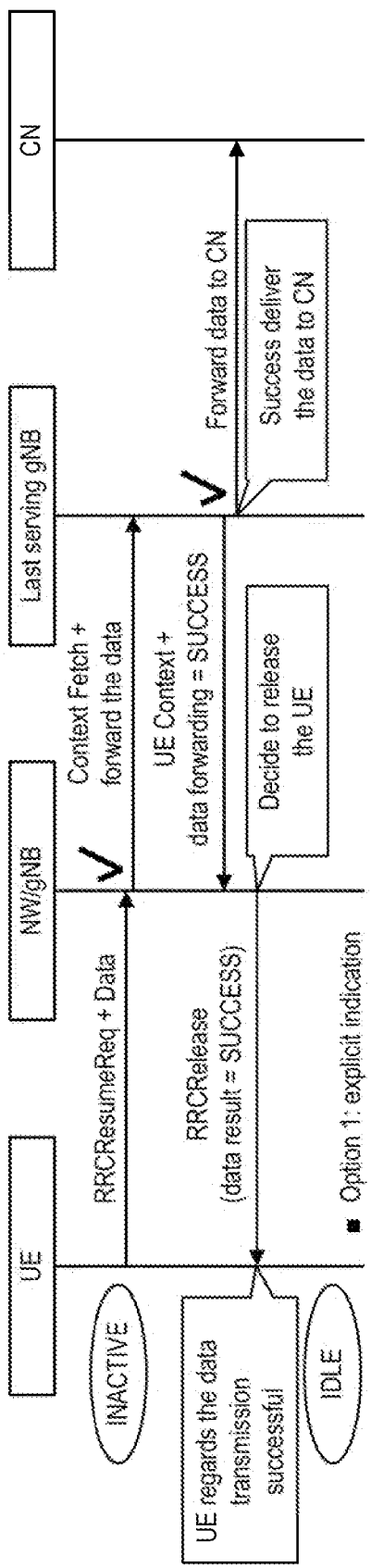
FIGS. 13A-13C illustrate three different ways to indicate success or failure of network data forwarding, in the case where an RRCRelease message is used to cause transition to an idle state, according to some embodiments.
Figure 13B:
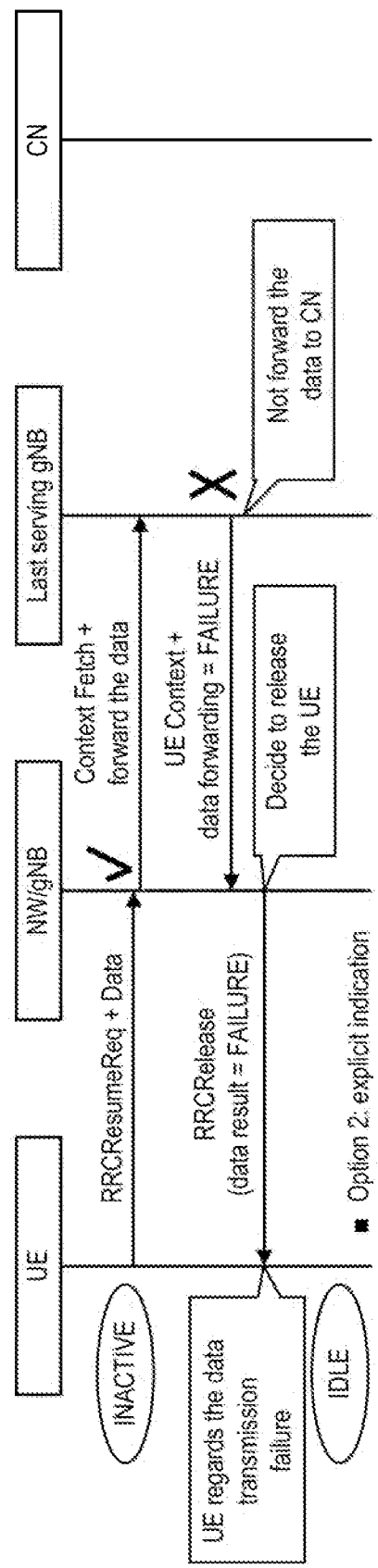
Figure 13C:
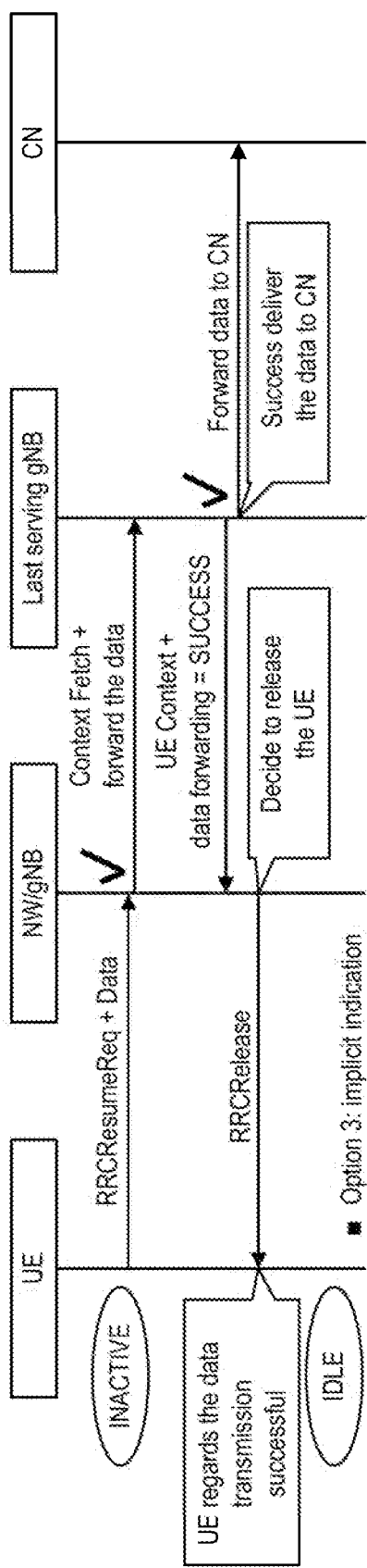

FIGS. 13A-13C relate to case 1 (where an RRCRelease message is used to cause the UE to enter the IDLE state), and illustrate three different ways to indicate success or failure of the network's handling of the user data to the UE, according to some embodiments.

As shown in FIG. 13A, after a current base station (e.g., a gNB of 3GPP NR) receives the RRCResume with user data, the current base station may send a context fetch and a data forwarding request (including the user data) to a last serving base station. The context fetch represents a request for the last serving base station to provide the UE context. In response, the last serving base station may attempt to forward the user data to the core network (CN). Assuming that the UE context is available and that the forwarding attempt was successful, the last serving base station may send to the current base station the requested UE context and an indication of data forwarding success. In response to receiving the UE context and the indication of data forwarding success, the current base station may then decide to release the UE, e.g., by transmitting to the UE a release message (e.g., an RRCRelease message) including an explicit indication of data forwarding success, in which case, the UE may transition to the IDLE state.

Alternatively, as shown in FIG. 13B, when the last serving base station receives the context fetch and the data forwarding request, the last serving base station may decide not to forward the user data to the core network (or determine that an attempt to forward the user data to the core network has failed). In that case, the last serving base station may send the UE context and an indication of data forwarding failure to the current base station. In response, the current base station may decide to release the UE, e.g., by transmitting to the UE an RRCRelease message including an explicit indication of data forwarding failure, IN response to receiving the RRCRelease message including the explicit indication of data forwarding failure, the UE may regarding its transmission of the user data as a failure, and transition to the IDLE state.

FIG. 13C shows an embodiment in which data forwarding success may be implicitly indicated by the current base station's action of transmitting the RRCRelease message. In response to receiving the RRCRelease message, the UE may regard its transmission of the user data as a success, and transition to the IDLE state. If the UE does not receive the RRCRelease message within a predetermined amount of time, the UE may assume that its transmission of the user data has failed.

Case 2: Inducing Transition to the Legacy INACTIVE State Using RRCRelease with Suspend Configuration FIGS. 14A-14C relate to case 2 (where an RRCRelease message with suspend configuration is used to cause the UE to enter a legacy INACTIVE state), and illustrate three different ways to indicate to the UE the success or failure of the network's handling of the user data, according to some embodiments. In some embodiments, the legacy INACTIVE state may be interpreted as an INACTIVE state in which user data transfer is not allowed, e.g., as with the INACTIVE state defined by existing 3GPP 5GNR specifications.

Figure 14A:
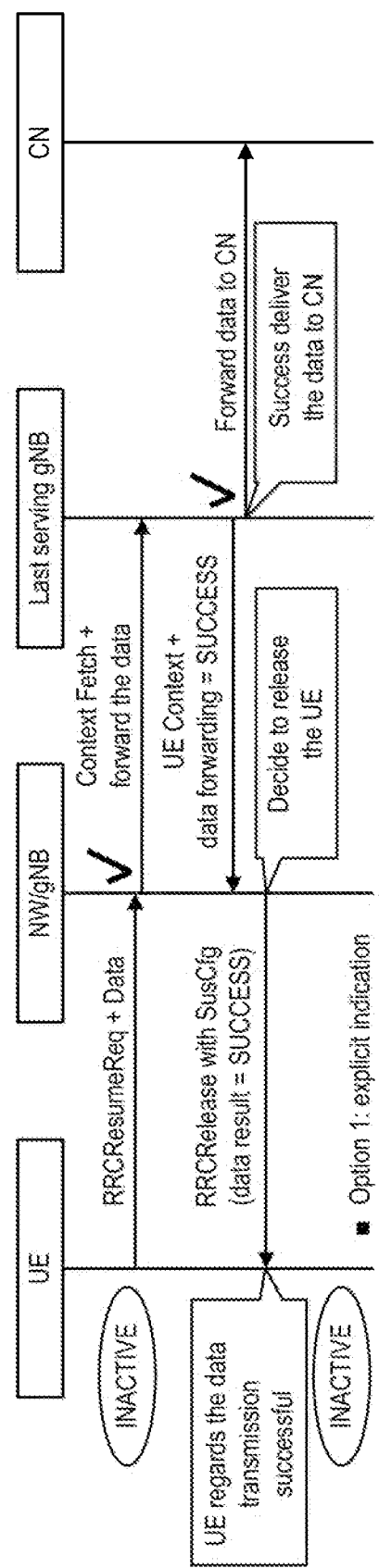

As shown in FIG. 14A, the last serving base station may send the UE context and an indication of data forwarding success to the current base station. In response, the current base station may to transmit to the UE an RRCRelease message with suspend configuration and an explicit indication of data forwarding success. In response to receiving the RRCRelease message with suspend configuration and explicit indication of data forwarding success, the UE may regard its transmission of the user data as successful, and transition to a legacy INACTIVE state.

Alternatively, as shown in FIG. 14B, when the last serving base station receives the context fetch and the data forwarding request (including the user data to be forwarded to the core network), the last serving base station may decide not to forward the user data to the core network (or determine that an attempt to forward the user data to the core network has failed), In that case, the last serving base station may send the UE context and an indication of data forwarding failure to the current base station. In response, the current base station may decide to release the UE by transmitting to the UE an RRCRelease with suspend configuration and an explicit indication of data forwarding failure. In response to receiving the RRCRelease with suspend configuration and explicit indication of data forwarding failure, the UE may regard its transmission of the user data to be a success, and may transition to a legacy INACTIVE state.

FIG. 14C shows an embodiment in which the data forwarding success may be implicitly indicated by the current base station's action of transmitting an RRCRelease message with a suspend configuration. In response to receiving the RRCRelease message with suspend configuration, the UE may regard its transmission of the user data as a success, and transition to the legacy INACTIVE state. If the UE does not receive the RRCRelease with suspend configuration within a predetermined amount of time, the UE may regard its transmission of the user data as a failure.

Case 3: Induce Transition to CONNECTED State Using RRCResume Message

Figure 15A:
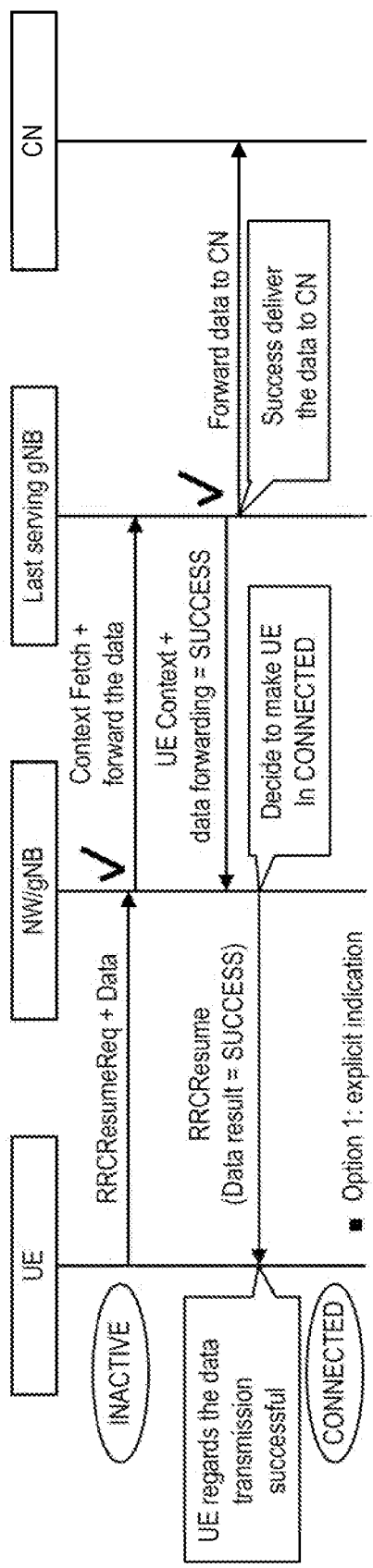
FIGS. 15A-15C illustrate three different ways to indicate success or failure of network data forwarding, in the case where an RRCResume message is used to cause transition to an connected state, according to some embodiments.
Figure 15B:
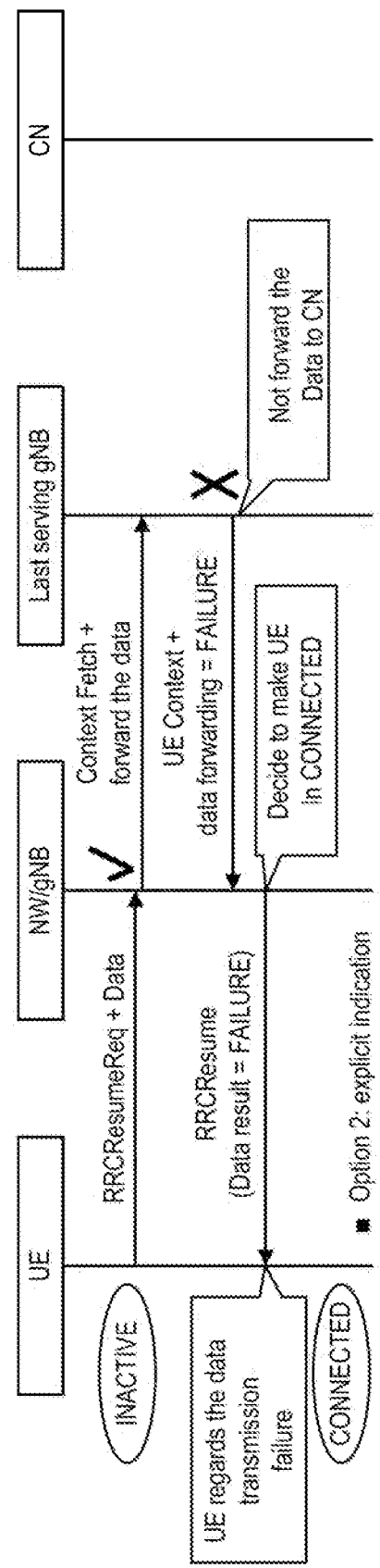
Figure 15C:
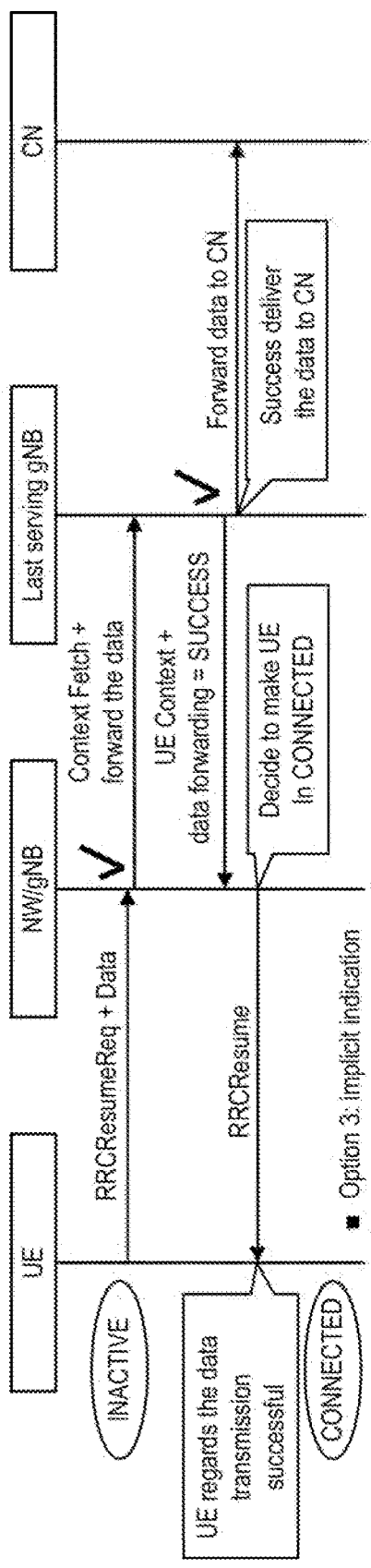

FIGS. 15A-15C relate to case 3 (where an RRCResume message is used to cause the UE to enter the CONNECTED state), and illustrate three different ways to indicate to the UE the success or failure of the network's handling of the user data, according to some embodiments.

As shown in FIG. 15A, after a current base station (e.g., a gNB of 3GPP NR) receives the RRCResume message with user data, the current base station may send a context fetch and a data forwarding request (including the user data) to a last serving base station. The context fetch represents a request for the last serving base station to provide the UE context. In response, the last serving base station may attempt to forward the user data to the core network (CN). Assuming that the UE context is available and that the forwarding attempt was successful, the last serving base station may send to the current base station the requested UE context and an indication of data forwarding success. In response to receiving the UE context and the indication of data forwarding success, the current base station may then decide to release the UE by transmitting to the UE an RRCResume message including an explicit indication of data forwarding success. IN response to receiving the RRCResume message including the explicit indication of data forwarding success, the UE may regard its transmission of the user data as successful, and transition to the CONNECTED state.

Alternatively, as shown in FIG. 15B, when the last serving base station receives the context fetch and the data forwarding request, the last serving base station may decide not to forward the user data to the core network (or determine that an attempt to forward the user data to the core network has failed). In that case, the last serving base station may send the UE context and an indication of data forwarding failure to the current base station. In response to receiving the UE context and the indication of data forwarding failure, the current base station may decide to make the UE transition to CONNECTED state, e.g., by transmitting to the UE an RRCResume message including an explicit indication of data forwarding failure. In response to receiving the RRCResume message including the explicit indication of data forwarding failure, the UE may regard its transmission of user data as a failure, and transition to the CONNECTED state.

FIG. 15C shows an embodiment in which data forwarding success may be implicitly indicated by the current base station's action of transmitting the RRCResume message. In response to receiving the RRCRelease message, the UE may regard its transmission of the user data as a success, and transition to the CONNECTED state. If the UE does not receive the RRCRelease within a predetermined amount of time, the UE may regard it transmission of the user data as a failure.

Case 4: Induce Transition to CONNECTED State Using RRCSetup

Figure 16A:
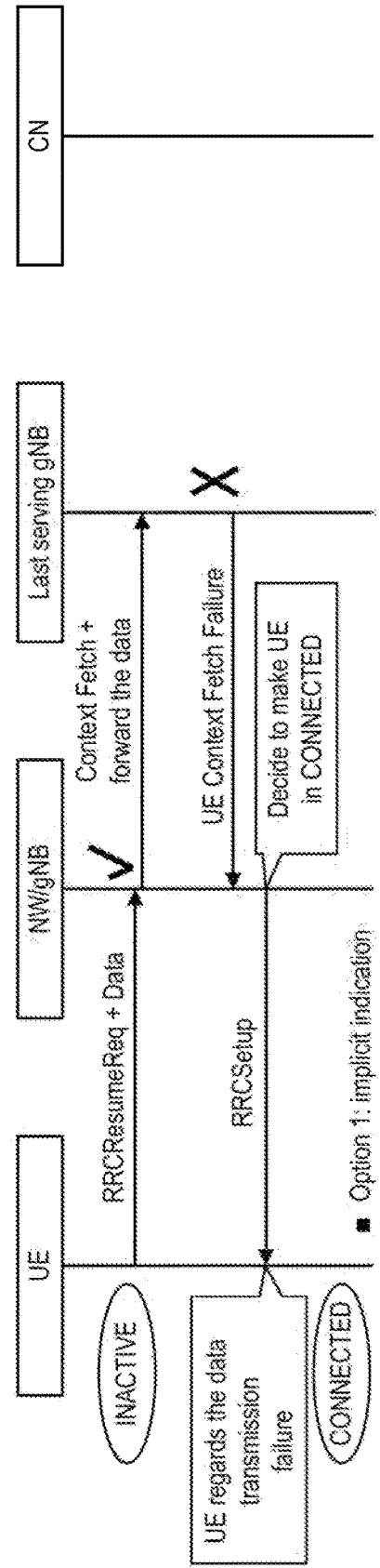

FIGS. 16A and 16B relate to case 4, where an RRCSetup message is used to implicitly indicate failure of the UE's user data transmission, and to cause the UE to enter the CONNECTED state.

As shown in FIG. 16A, when the last serving base station receives the context fetch and the data forwarding request (including the user data), the last serving base station may determine that it cannot (or will not) provide the UE context, and may respond by sending to the current base station an indication that the request for UE context has failed. In response to receiving the indication of context fetch failure, the current base station may decide that the UE should transition to the CONNECTED state. The UE may cause this transition by transmitting to the UE a setup message (e.g., an RRCSetup message). The RRCSetup message implicitly indicates to the UE that its transmission of the user data was a failure. In response to receiving the RRCSetup message, the UE may regard the user data transmission as a failure, and transition to the CONNECTED state.

As shown in FIG. 16B, in response to receiving a resume request (e.g., an RRCResumeReq) with user data, the current base station may decide to make the UE transition to the CONNECTED state, e.g., without any attempt to fetch the UE context or to forward the user data to the last serving base station or the core network. The current base station may implicitly indicate failure of the UE's user data transmission by transmitting a setup message (e.g., an RRCSetup message) to the UE. In response to receiving the setup message, the UE may regard its user data transmission as a failure, and transition to the CONNECTED state.

Case 5: Causing the UE to Remain in Legacy INACTIVE State Using RRCReject

Figure 17B:
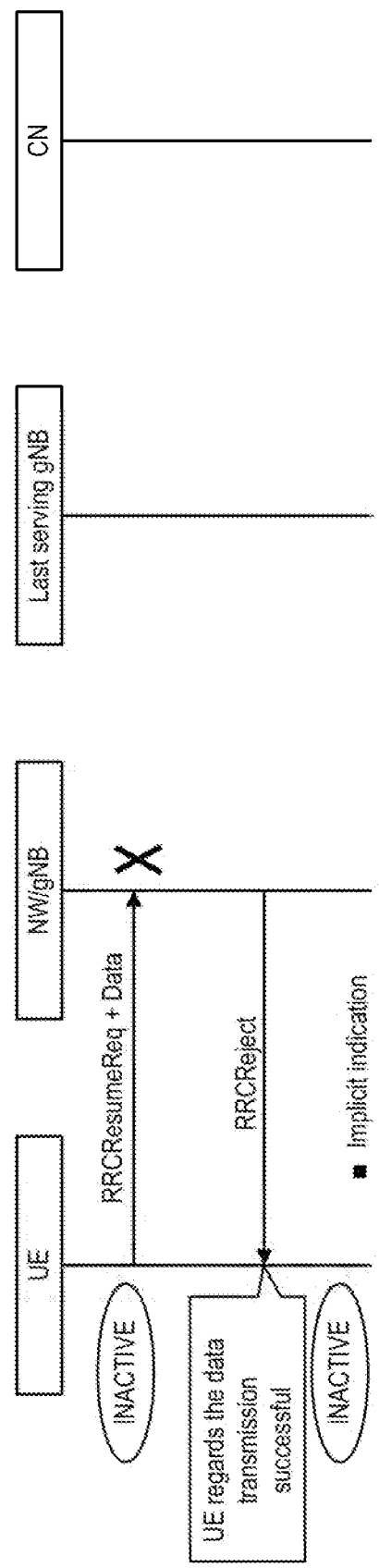

FIGS. 17A and 17B relate to case 5, where an RRCReject message is used to implicitly indicate failure of the UE's user data transmission, and to cause the UE to remain in a legacy INACTIVE state.

As shown in FIG. 17A, when the last serving base station receives the context fetch and the data forwarding request (including the user data), the last serving base station may: determine that it cannot (or will not) fetch the UE context; decide not to forward the user data to the core network (or determine that an attempt to forward the user data to the core network has failed); and respond by sending to the current base station an indication that the request for UE context has failed. In response to receiving the indication of context fetch failure, the current base station may decide that the UE's request to resume connection should be rejected, e.g., due to congestion. Thus, the UE may cause the UE to transition to the legacy INACTIVE state by transmitting to the UE an RRCReject message. The RRCReject message implicitly indicates to the UE that its transmission of the user data was a failure. In response to receiving the RRCReject message, the UE may regard its user data transmission as a failure, and transition to the legacy INACTIVE state.

As shown in FIG. 17B, in response to receiving a resume request (e.g., an RRCResumeReq) with user data, the current base station may decide to make the UE transition to the legacy INACTIVE state, e.g., without any attempt to fetch the UE context or to forward the user data to the last serving base station or the core network. In this case, the current base station may implicitly indicate failure of the UE's user data transmission by transmitting a reject message (e.g., an RRCReject message) to the UE. In response to receiving the reject message, the UE may regard its user data transmission as a failure, and transition to the legacy INACTIVE state.

Case 6: Network Control of the Subsequent Data Transmission

In some embodiments, upon receiving a first UL transmission from the INACTIVE UE, the network may decide to keep the UE in the INACTIVE state, and enable subsequent data transmission via dedicated scheduling/transmission. The network may trigger the UE to enter the subsequent data transmission mode, e.g., via an L2 or L3 command.

Figure 18:
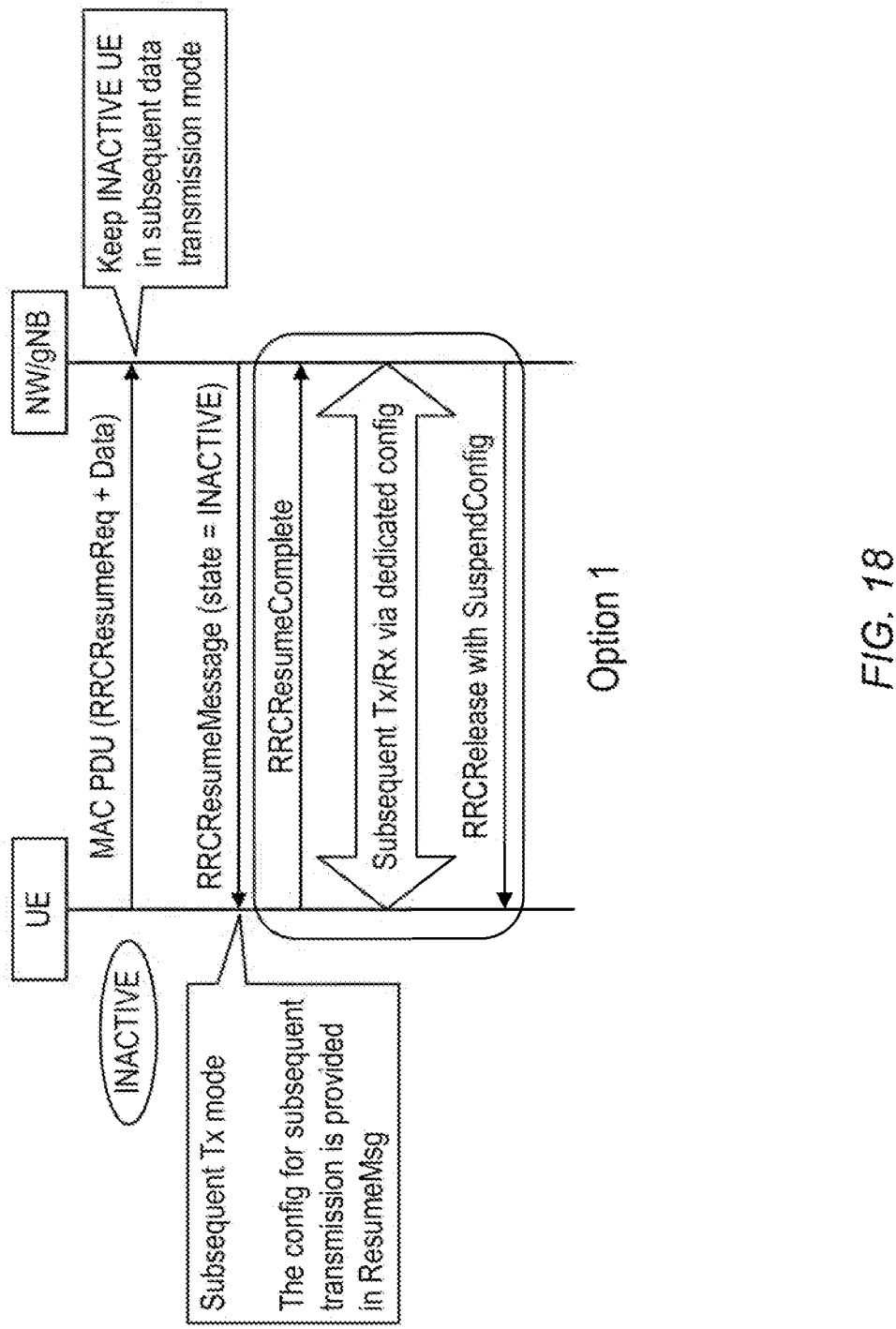
FIGS. 18-22 illustrates various ways to enable a subsequent user data transmission and/or reception while the user equipment remains in the inactive state, according to some embodiments.

In a first option, the current base station may transmit an RRCResume message with an explicit state indication (state=INACTIVE). FIG. 18 illustrates an embodiment of this first option. In response to receiving a MAC PDU including the resume request and a user data portion, the current base station may decide to cause the UE to remain in the INACTIVE state and to transition to a subsequent data transmission mode. In response to making this decision, the current base station may transmit an RRCResume message with an explicit indication of the INACTIVE state. The configuration for subsequent transmission may be provided in the RRCResume message. The RRCResume message may implicitly indicate to the UE that the user data was successfully forwarded to the core network. In response to receiving the RRCResume message with explicit indication, the UE may regard the user data transmission as successful, and enter a subsequent transmission mode. In the subsequent transmission mode, the UE may perform a subsequent user data transmission while remaining in the INACTIVE state. For example, the LIE may transmit an RRCResume Complete message to the current base station; and then engage in subsequent user data transmission and/or reception using dedicated configuration. After the subsequent user data transmission and/or reception is complete, the current base station may send an RRCRelease message with suspend configuration.

Figure 19:
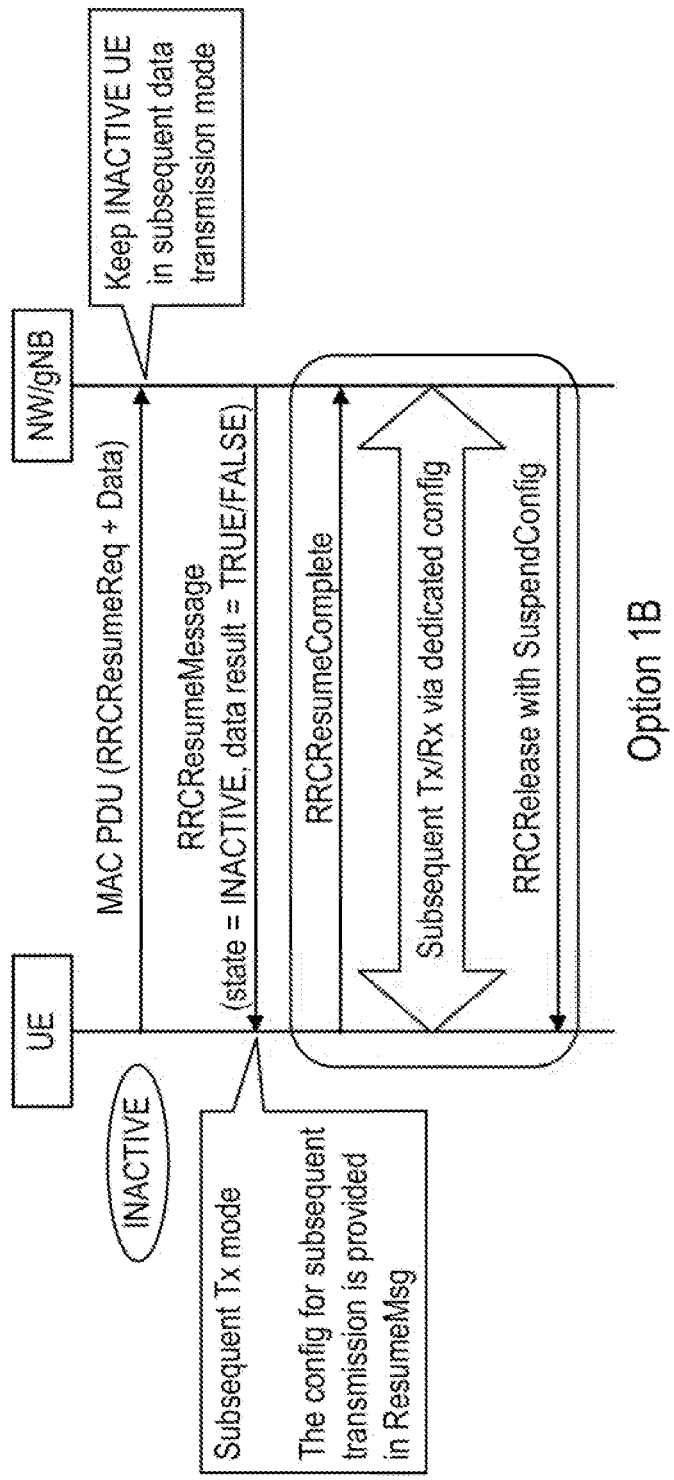

Similar to the first option, in an option 1B, the current base station may transmit an RRCResume message with an explicit indication of the INACTIVE state as the state in which the UE is to remain. However, in option 1B, the RRCResume message may also include an explicit indication of whether or not the user data was successfully forwarded to the core network, e.g., as shown in FIG. 19. In response to receiving the RRCResume message, the UE may determine whether its user data transmission was successful based on the explicit indication. If the user data transmission was successful, the UE may clear the corresponding user data from its buffer and proceed to transmit a next portion of user data while in the INACTIVE state. If the user data transmission was unsuccessful, the UE may attempt to retransmit the user data.

Figure 20:
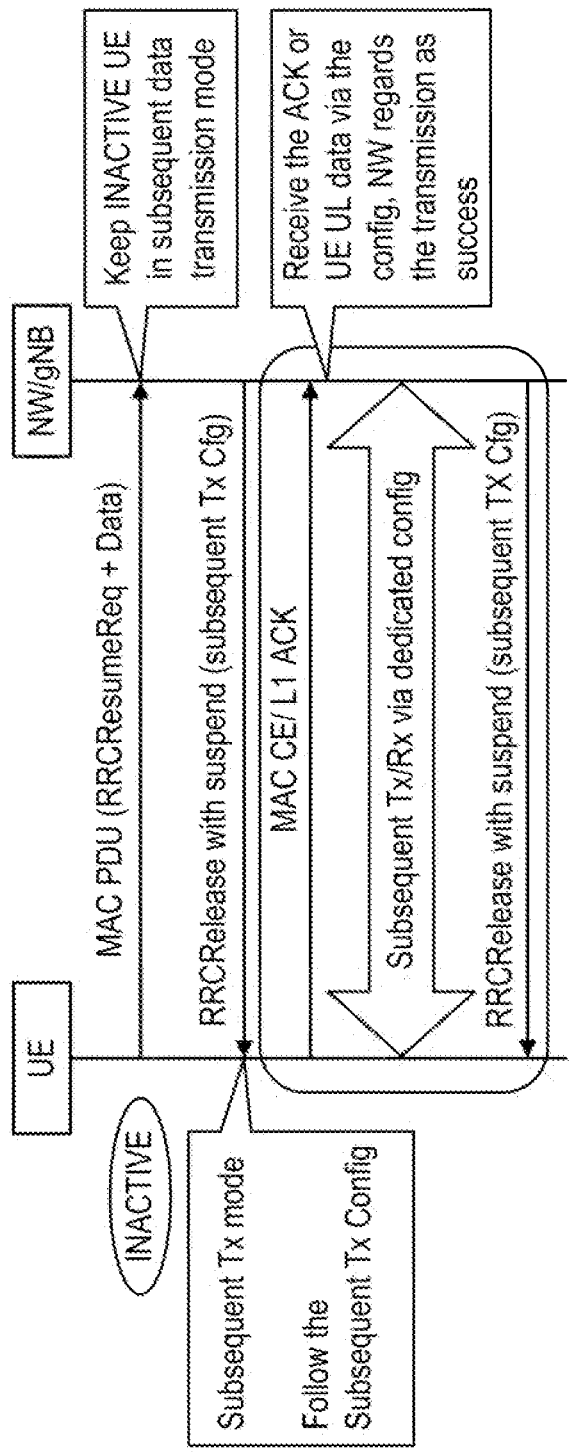

In a second option, the current base station may transmit an RRCRelease message with a subsequent transmission configuration. FIG. 20 illustrates an embodiment of this second option. In response to receiving a MAC PDU including the resume request and a user data portion, the current base station may decide to cause the UE to remain in the INACTIVE state and to transition to a subsequent data transmission mode. In response to making this decision, the current base station may transmit an RRCRelease message with suspend, including (or indicating) a subsequent transmission configuration. In response to receiving the RRCRelease message with suspend and subsequent transmission configuration, the UE may remain in the INACTIVE state and enter a subsequent transmission mode. In the subsequent transmission mode, the UE, may perform subsequent user data transmission/reception while remaining in the INACTIVE state. For example, the UE may transmit a MAC CE/L1 ACK to the current base station; and then engage in subsequent user data transmission and/or reception using dedicated configuration (e.g., dedicated configuration provided with the RRCRelease message). After the subsequent user data transmission and/or reception is complete, the current base station may send an RRCRelease with suspend for the subsequent transmission configuration.

Figure 21:
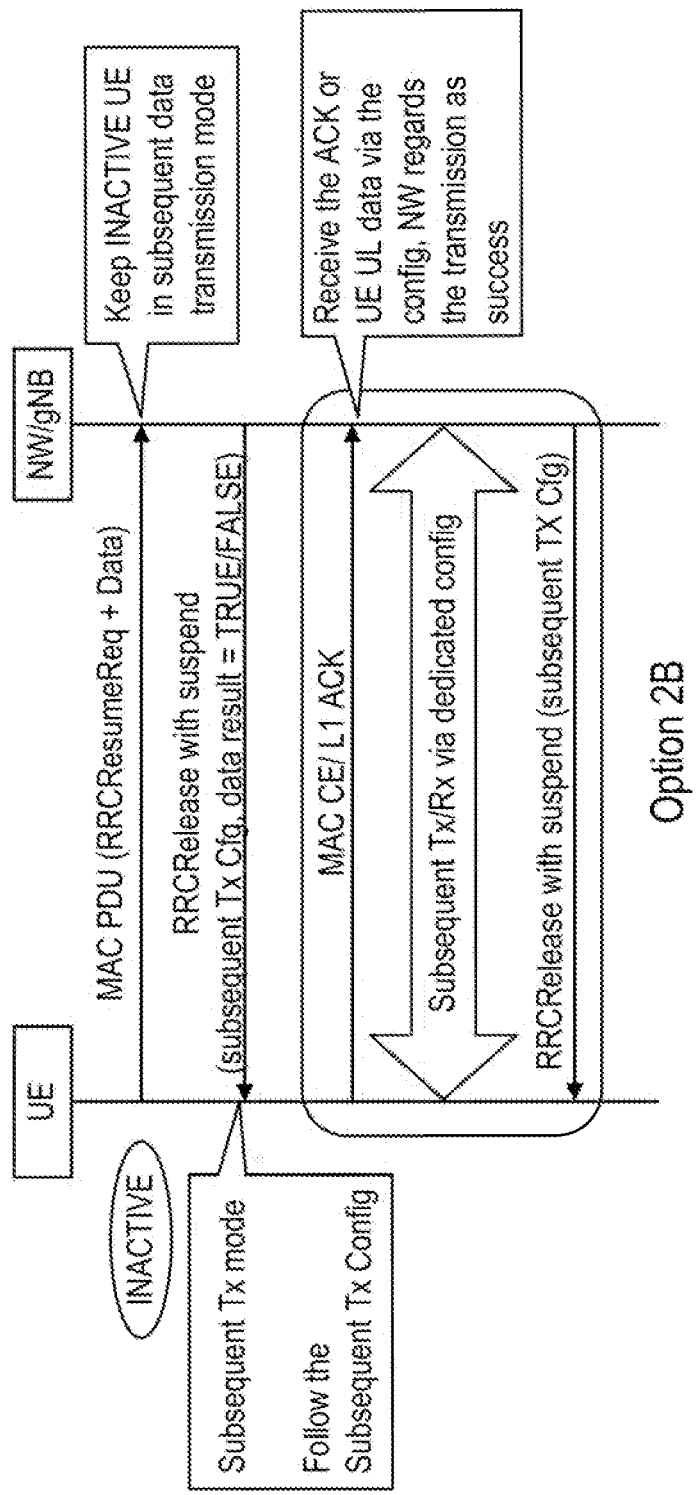

Similar to the above second option, in an option 2B, the current base station may transmit an RRCRelease message including a subsequent transmission configuration. However, in option 2B, the RRCRelease message may also include an explicit indication of whether or not the user data was successfully forwarded to the core network, e.g., as shown in FIG. 21. In response to receiving the RRCRelease message, the UE may determine whether its user data transmission was successful based on the explicit indication. If the user data transmission was successful, the UE may clear the corresponding user data from its buffer and proceed to transmit a next portion of user data while in the INACTIVE state. If the user data transmission was unsuccessful, the UE may attempt to retransmit the user data.

Figure 22:
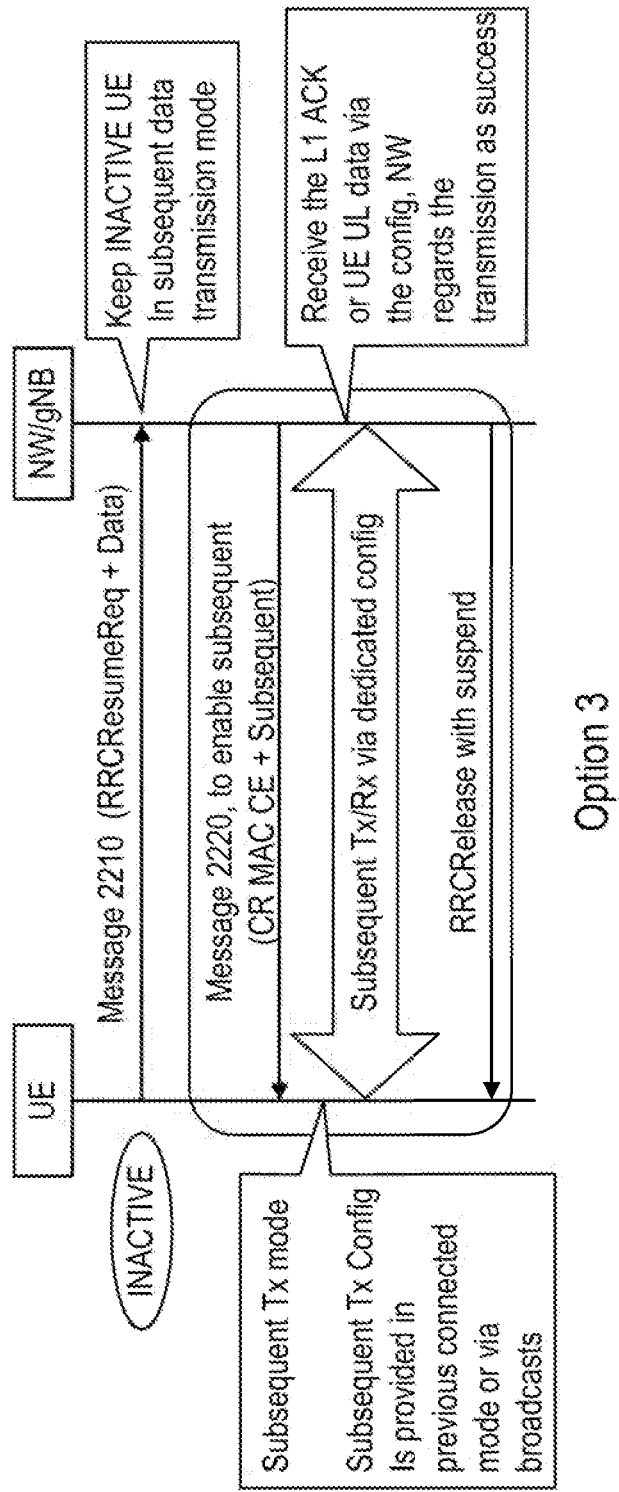

In a third option, the current base station may employ an L1/L2 command. FIG. 22 illustrates an embodiment of this third option. In response to receiving a message 2210 (e.g., a MAC PDU) including the resume request and a user data portion, the current base station may decide to cause the UE to remain in the INACTIVE state and to transition to a subsequent data transmission mode. (The message 2210 may be, e.g., a MSG3 of a random access procedure.) In response to making this decision, the current base station may transmit message 2220 (e.g., an L1 and/or L2 message) to enable subsequent user data transmission. (The message 2220 may be, e.g., a MSG4 of a random access procedure.) The message 2220 may include a CR MAC CE and an indication that the UE should enter the subsequent transmission mode while remaining in the INACTIVE state. (CR is an acronym for Contention Resolution.) In response to receiving the message 2220, the UE may enter the subsequent transmission mode, and perform subsequent user data transmission and/or reception using a subsequent transmit configuration, which is provided in a previous connected mode or via broadcast(s) from the network (e.g., from the current base station). In response to receiving from the UE an L1 acknowledgement or the UE uplink data via the configuration, the network may regard the transmission as a success.

FIG. 23—Method for Operating a User Equipment (UE) Device

In one set of embodiments, a method 2300 for operating a user equipment (UE) device may include the operations shown in FIG. 23. (The method 2300 may also include any subset of the features, elements or operations described above.) The method 2300 may be performed by processing circuitry of the UE device, e.g., by the processing element 610 of user equipment 600.

As shown at 2310, while the UE device is in an inactive state, the processing circuitry may transmit information to a network, where the information includes a Radio Resource Control (RRC) message. The RRC message may include an indication of the UE device's intent to perform transmission and/or reception of user data with the network during the inactive state. The action of transmitting the information to the network may include transmitting the information to a current base station of the network, e.g., to a current gNB in the context of 3GPP 5GNR.

In some embodiments, the RRC message may be an RRC resume request message. Furthermore, the information transmitted at 2310 may include: at least a portion of the user data; and/or a buffer status report. (The buffer status report may indicate an amount of data currently residing in an uplink transmit buffer.) For example, the buffer status report may be included if the amount of user data to be transmitted exceeds a threshold value.

In some embodiments, the information transmitted at 2310 (or the RRC message) may include identity information to enable the network to identify the UE device and/or to fetch context information associated with the UE device, e.g., as variously described above.

In some embodiments, the RRC message may include a cause indicator field that indicates a cause for which the RRC message is being transmitted. The cause indicator field may be set to a value indicating data transmission (or small data transmission) as the cause.

In some embodiments, the information transmitted at 2310 is (or, is part of) a Medium Access Control Protocol Data Unit (MAC PDU), e.g., as variously described above. A MAC PDU may include one or more sub-PDUs. One of the sub-PDUs (e.g., a first of the sub-PDUs) of the MAC PDU may include the RRC message. Another one of the sub-PDUs (e.g., a second of the sub-PDUs) may include said at least a portion of the user data.

In some embodiments, the method 2300 may also include, while in the inactive state, receiving a response message from the network, wherein the response message induces a state transition in the UE device.

In some embodiments, the response message may be a release message (e.g., an RRCRelease message), and may induce a state transition to an idle state.

In some embodiments, the response message may be a release message with a suspend configuration, and may induce a state transition to a legacy inactive state.

In some embodiments, the response message may be a resume message, and may induce a state transition to a connected state.

In some embodiments, the response message may be a setup message, and may induce a state transition to a connected state.

In some embodiments, the response message may cause the UE device to stay in the inactive state and enter a subsequent user data transmission mode. In the subsequent user data transmission mode, the UE device may transmit and/or receive additional user data (or, an addition of portion of the user data mentioned at 2310) while remaining in the inactive state, e.g., as described above in the context of FIGS. 18-22.

In some embodiments, the response message may implicitly indicates that forwarding of the user data to a core network was successful In some embodiments, the response message may explicitly indicate whether forwarding of the user data to a core network was successful.

In some embodiments, a non-transitory memory medium may store program instructions. The program instructions, when executed by processing circuitry, may cause the processing circuitry to perform the method of embodiments described above and any combination of those embodiments. The memory medium may incorporated as part of a user equipment device.

FIG. 24—Method for Operating a Base Station

In one set of embodiments, a method 2400 for operating a base station (BS) may include the operations shown in FIG. 24. (The method 2400 may also include any subset of the features, elements or operations described above.) The method may be performed by processing circuitry of the base station, e.g., by the processing element 710 of base station 700.

At shown at 2410, while a user equipment (UE) device is in an inactive state, the processing circuitry may receive information from the UE device where the information includes a Radio Resource Control (RRC) message. The RRC message may include an indication of the UE device's intent to perform transmission and/or reception of user data with the network during the inactive state. (For example, the user data may originate from the UE device, e.g., from an application executing on the UE device. Alternatively, the user data may originate from the network, and it to be received by the UE device.)

In some embodiments, the RRC message may be an RRC resume request message. Furthermore, the information received at 2410 may include: at least a portion of the user data; and/or a buffer status report. (The buffer status report may indicate an amount of data currently residing in an uplink transmit buffer of the UE device.) For example, the buffer status report may be included if the amount of user data to be transmitted by the UE device exceeds a threshold value.

In some embodiments, the information received at 2410 (or the RRC message) may include identity information to enable the network to identify the UE device and/or to fetch context information associated with the UE device, e.g., as variously described above. The base station may employ the identity information to request a fetch of the UE context, e.g., from a last serving base station.

In some embodiments, the RRC message may include a cause indicator field that indicates a cause for the RRC message. The cause indicator field is set to a value indicating data transmission (or small data transmission) as the cause.

In some embodiments, the message is (or is contained within) a Medium Access Control Protocol Data Unit (MAC PDU), e.g., as variously described above.

In some embodiments, the method 2400 may also include, while the UE device is in the inactive state, transmitting a response message to the UE device. The response message may induce a state transition in the UE device, e.g., as variously described above.

In some embodiments, the response message may be a release message (e.g., an RRCRelease message), and may induce a state transition to an idle state.

In some embodiments, the response message may be a release message (e.g., an RRCRelease message) with a suspend configuration, and may induce a state transition to a legacy inactive state.

In some embodiments, the response message may be a resume message (e.g., an RRCResume message), and may induce a state transition to a connected state.

In some embodiments, the response message may be a setup message (e.g., an RRCSetup message), and may induce a state transition to a connected state.

In some embodiments, the response message may cause the UE device to stay in the inactive state and enter a subsequent user data transmission mode. While the UE device remains in the inactive state and the subsequent user data transmission mode, the base station may transmit and/or receive additional user data (or an addition portion of the user data mentioned at 2410) to/from the UE device.

In some embodiments, the response message may implicitly indicate that forwarding of the user data to a core network was successful, e.g., as variously described above.

In some embodiments, the response message may explicitly indicate whether forwarding of the user data to a core network was successful, e.g., as variously described above.

In some embodiments, the base station may serve as a gNB in a network according to the 3GPP 5GNR standard.

In some embodiments, a non-transitory memory medium may store program instructions. The program instructions, when executed by processing circuitry, may cause the processing circuitry to perform any of the method embodiments described above, and any combination of those embodiments. The memory medium may incorporated as part of a base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a user equipment (UE) device, comprising:
    entering an inactive state;
    while in the inactive state, encoding a transmission to a network, the transmission including a Radio Resource Control (RRC) resume request message and first user data;
    receiving, from the network, an acknowledgement of the transmission;
    exchanging subsequent user data with the network while in the inactive state; and
    receiving, from the network, an RRC release message with suspend indication.

2. The method of claim 1, wherein the transmission includes:
    a buffer status report.

3. The method of claim 1, wherein the RRC resume request message includes a cause indicator field that indicates a cause for which the RRC resume request message is being transmitted, wherein the cause indicator field is set to a value indicating data transmission as the cause.

4. The method of claim 1, wherein the transmission is directed to a current base station of the network.

5. The method of claim 1, further comprising:
    while in the inactive state, receiving a response message from the network, wherein the response message induces a state transition.

6. The method of claim 5, wherein:
    the response message is a release message and induces a state transition to an idle state; or
    the response message is a release message with a suspend configuration and induces a state transition to a legacy inactive state.

7. The method of claim 5, wherein:
    the response message is a resume message and induces a state transition to a connected state; or
    the response message is a setup message and induces a state transition to a connected state.

8. The method of claim 5, further comprising, in response to the response message staying in the inactive state and entering a subsequent user data transmission mode.

9. The method of claim 5, wherein the response message implicitly indicates that forwarding of the subsequent user data to a core network was successful.

10. The method of claim 5, wherein the response message explicitly indicates whether forwarding of the subsequent user data to a core network was successful.

11. A method for operating a base station (BS), comprising:
    while a user equipment (UE) device is in an inactive state, receiving, by the BS from the UE device, a transmission including a Radio Resource Control (RRC) resume request message and first user data;
    deciding, by the BS, to keep the UE in the inactive state;
    exchanging subsequent user data with the UE while the UE is in the inactive state; and
    transmitting, to the UE, an RRC release message with suspend indication.

12. The method of claim 11, wherein the RRC resume request message includes a cause indicator field that indicates a cause for which the RRC resume request message is being transmitted, wherein the cause indicator field is set to a value indicating data transmission as the cause.

13. The method of claim 11, further comprising:
    while the UE device is in the inactive state, transmitting a response message to the UE device, wherein the response message induces a state transition in the UE device.

14. The method of claim 13, wherein:
    the response message is a release message and induces a transition to an idle state; or
    the response message is a release message with a suspend configuration and induces a transition to a legacy inactive state; or
    the response message is a resume message and induces a transition to a connected state; or
    the response message is a setup message and induces a transition to a connected state.

15. The method of claim 13, wherein the response message directs the UE device to stay in the inactive state and enter a subsequent user data transmission mode.

16. A baseband processor configured to perform operations comprising:
    entering an inactive state;
    while in the inactive state, encoding a transmission to a network, the transmission including a Radio Resource Control (RRC) resume request message and first user data;
    receiving, from the network, an acknowledgement of the transmission;
    exchanging subsequent user data with the network while in the inactive state; and
    receiving, from the network, an RRC release message with suspend indication.

17. The baseband processor of claim 16, wherein the acknowledgement is a layer 1 acknowledgement.

18. The method of claim 11, further comprising:
transmitting, to the UE device, and acknowledgement of the transmission.

19. The method of claim 18, wherein the acknowledgement is a layer 1 acknowledgement.

* * * * *